United States Patent
Namizuka

(10) Patent No.: US 7,751,071 B2
(45) Date of Patent: Jul. 6, 2010

(54) IMAGE REPRODUCTION APPARATUS, IMAGE REPRODUCTION METHOD, AND PROGRAM FOR IMPLEMENTING THE METHOD ON A COMPUTER

(75) Inventor: Yoshiyuki Namizuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1871 days.

(21) Appl. No.: 10/805,184

(22) Filed: Mar. 22, 2004

(65) Prior Publication Data

US 2004/0233467 A1 Nov. 25, 2004

(30) Foreign Application Priority Data

Mar. 20, 2003 (JP) ............... 2003-079168

(51) Int. Cl.
*G06F 3/12* (2006.01)
*G06K 15/02* (2006.01)

(52) U.S. Cl. .................. 358/1.13; 358/1.15; 358/1.2

(58) Field of Classification Search ............ 358/1.9, 358/1.13, 1.15, 1.2, 2.1, 3.26, 474; 382/194, 382/276–311, 176; 710/15, 36; 348/222.1; 355/44

See application file for complete search history.

(56) References Cited

U.S. PATENT DOCUMENTS

| | | | |
|---|---|---|---|
| 5,548,664 A * | 8/1996 | Knowlton ............... 382/174 |
| 5,727,083 A * | 3/1998 | Kelly et al. .............. 382/232 |
| 5,881,333 A * | 3/1999 | Takahashi et al. ........... 399/2 |
| 6,211,967 B1 | 4/2001 | Namizuka |
| 6,278,513 B1 * | 8/2001 | Murata et al. ............. 355/44 |
| 6,278,526 B1 * | 8/2001 | Kurozasa ................ 358/1.15 |
| 7,312,898 B2 * | 12/2007 | Feng et al. ............... 358/2.1 |
| 2001/0050778 A1 | 12/2001 | Fukuda et al. |
| 2002/0036643 A1 | 3/2002 | Namizuka et al. |
| 2002/0075527 A1 | 6/2002 | Ito |

(Continued)

FOREIGN PATENT DOCUMENTS

EP 0926622 A2 * 12/1998

(Continued)

OTHER PUBLICATIONS

U.S. Appl. No. 10/279,878, filed Oct. 25, 2002, Fukuda et al.

(Continued)

*Primary Examiner*—King Y Poon
*Assistant Examiner*—Iriana Cruz
(74) *Attorney, Agent, or Firm*—Oblon, Spivak, McClelland, Maier & Neustadt, L.L.P.

(57) ABSTRACT

An image reproduction apparatus having a basic function at low cost, and additional functions as an option. The image reproduction apparatus is configured to detect invalid pixels, remove a black streak, and detect a blank document page. The image reproduction apparatus includes a base engine/image data controller that includes a process controller, a RAM used as a work area, a ROM in which operation commands are stored, a video controller that processes image data and controls the flow of image data, and an I/O controller that monitors and controls I/Os of various devices, such as drivers or sensors, wherein those parts are connected via a CPU bus. The image reproduction apparatus can be extended into the form of a digital multifunction device by connecting a controller board to the base engine/image data controller via a parallel bus.

7 Claims, 29 Drawing Sheets

U.S. PATENT DOCUMENTS

| | | | |
|---|---|---|---|
| 2002/0122189 | A1 | 9/2002 | Salgado |
| 2002/0126313 | A1 | 9/2002 | Namizuka et al. |
| 2003/0090742 | A1* | 5/2003 | Fukuda et al. ............... 358/448 |
| 2003/0137701 | A1* | 7/2003 | Shimizu ..................... 358/474 |
| 2003/0197794 | A1* | 10/2003 | Sakata ..................... 348/222.1 |

FOREIGN PATENT DOCUMENTS

| | | |
|---|---|---|
| EP | 0 926 622 | 6/1999 |
| EP | 0926622 A2 * | 6/1999 |
| EP | 0926622 A2 * | 6/1999 |
| JP | 02-096464 | 4/1990 |
| JP | 4-328948 | 11/1992 |
| JP | 06-233062 | 8/1994 |
| JP | 2000196881 * | 7/2000 |
| JP | 2000-287024 | 10/2000 |
| JP | 2000-316073 | 11/2000 |
| JP | 2001-067201 | 3/2001 |
| JP | 2002-057901 | 2/2002 |
| JP | 2002-335364 | 11/2002 |

OTHER PUBLICATIONS

U.S. Appl. No. 10/078,713, filed Feb. 19, 2002, Namizuka.
U.S. Appl. No. 09/960,944, filed Sep. 25, 2001, Namizuka et al.
U.S. Appl. No. 09/847,192, filed May 2, 2001, Fukuda et al.
U.S. Appl. No. 09/551,509, filed Apr. 17, 2000, Namizuka, et al.
U.S. Appl. No. 09/654,050, filed Sep. 1, 2000, Miyazaki et al.
U.S. Appl. No. 09/665,054, filed Sep. 19, 2000, Takahashi et al.
U.S. Appl. No. 09/693,987, filed Oct. 23, 2000, Kawamoto et al.
U.S. Appl. No. 09/705,836, filed Nov. 6, 2000, Oteki et al.
U.S. Appl. No. 09/704,624, filed Nov. 3, 2000, Namizuka.
U,S. Appl. No. 09/706,783, filed Nov. 7, 2000, Miyazaki et al.
U.S. Appl. No. 09/706,781, filed Nov. 7, 2000, Oteki et al.
U.S. Appl. No. 09/713,194, filed Nov. 16, 2000, Namizuka et al.
U.S. Appl. No. 09/725,569, filed Nov. 30, 2000, Namizuka et al.
U.S. Appl. No. 09/735,649, filed Dec. 14, 2000, Fukuda et al.
U.S. Appl. No. 09/748,240, filed Dec. 27, 2000, Yoshizawa et al.
U.S. Appl. No. 09/748,262, filed Dec. 27, 2000, Namizuka et al.
U.S. Appl. No. 09/749,819, filed Dec. 28, 2000, Fukuda et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/801,843, filed Mar. 9, 2001, Fukuda et al.
U.S. Appl. No. 10/360,749, filed Feb. 10, 2003, Namizuka
U.S. Appl. No. 10/393,945, filed Mar. 24, 2003, Namizuka.
U.S. Appl. No. 11/129,311, filed May 16, 2005, Namizuka, et al.
U.S. Appl. No. 11/129,338, filed May 16, 2005, Namizuka, et al.

* cited by examiner

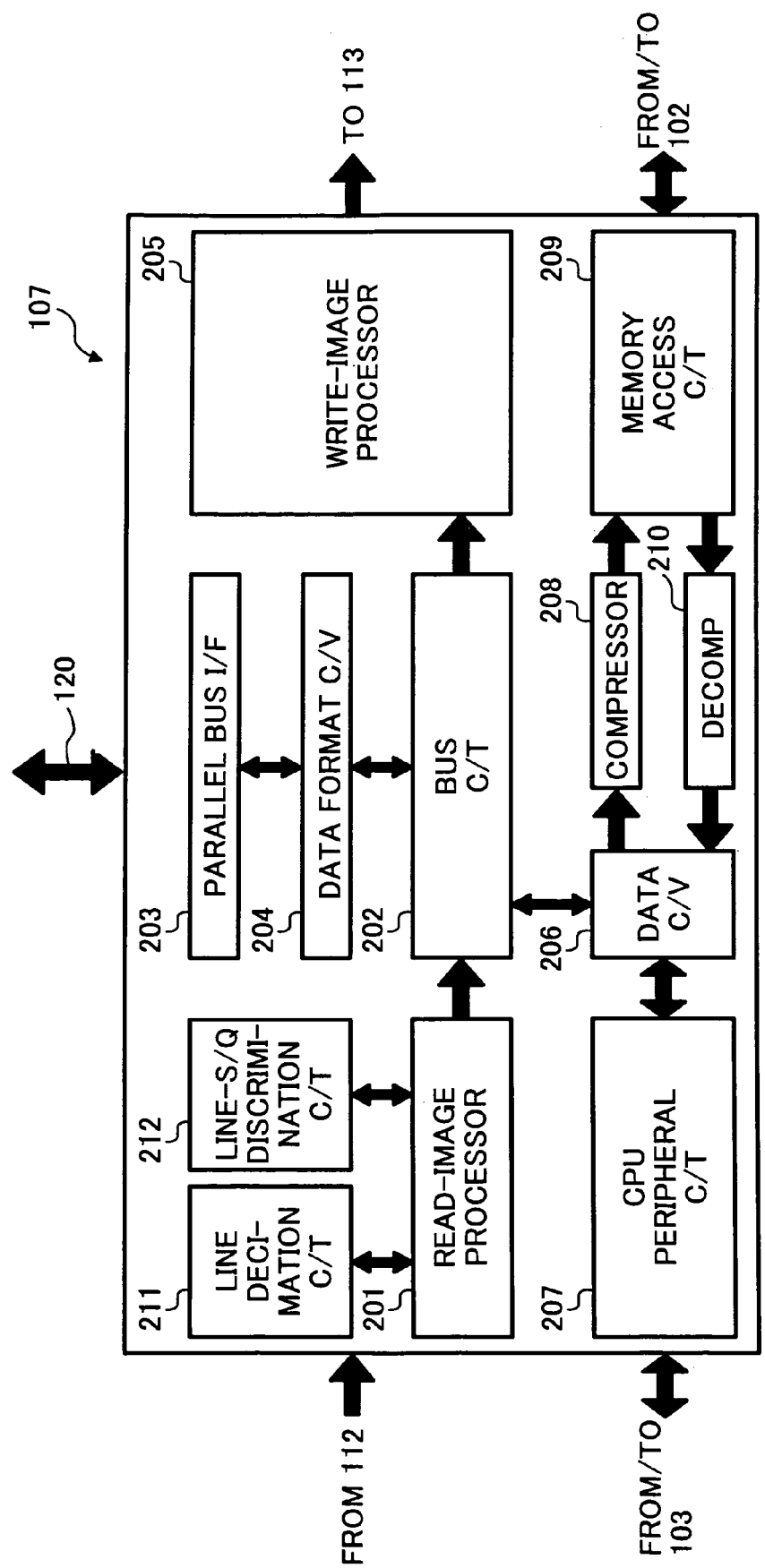

FIG. 9B

REDUCTION RATIO: S%

| MULTI-LEVEL | DECIMATION | AVERAGE / COMPARISON | |
|---|---|---|---|
| REDUCTION RATIO | - | $\geqq 50\%$ | $<50\%$ |
| xlg_mb | S% (lgm) | 100% (lg) | 2S% (lgm) |
| xlg_avc | 100% (lgm) | S% (lgm) | 50% (lg2) |

REDUCTION RATIO: S%

| BINARY OR OPERATION | TOTAL REDUCTION RATIO | |
|---|---|---|
| | OFF | ON |
| xlg_rd | S% | |
| xlg_rdor | S% (xlg_rd) | s/2% (lg_rd22) |

FIG. 10A
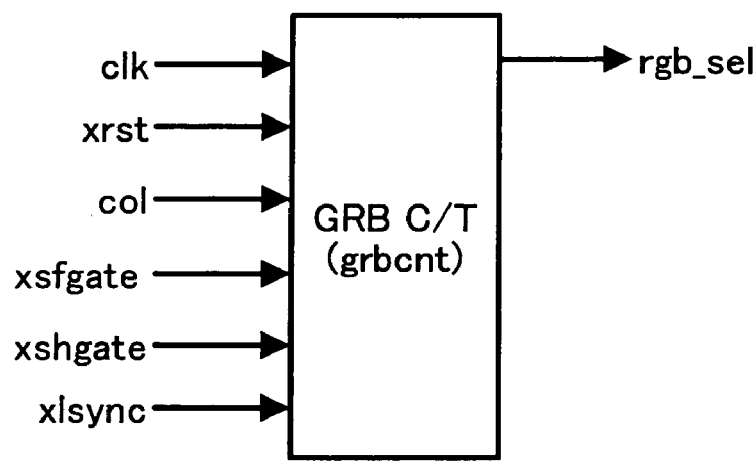
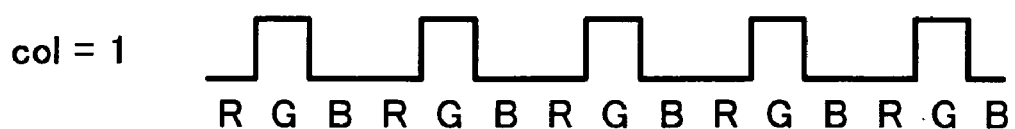
col = 1
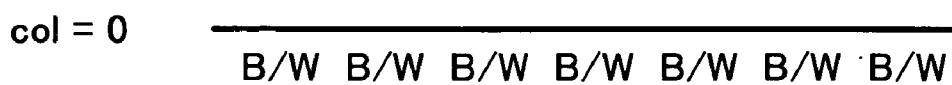
col = 0
TURNING-ON/OFF OF CIS

FORWARD DIRECTION

FAULT IMAGES

LAMP

LIGHT PATH

IMAGE REPRODUCTION APPARATUS, IMAGE REPRODUCTION METHOD, AND PROGRAM FOR IMPLEMENTING THE METHOD ON A COMPUTER

CROSS-REFERENCE TO RELATED APPLICATIONS

The present application is based on and claims priority to Japanese patent application No. JPAP2003-079168 filed on Mar. 20, 2003 in the Japan Patent Office, the entire contents of which are incorporated herein by reference.

BACKGROUND OF THE INVENTION

1. Field of the Invention

The present invention relates to an image reproduction apparatus for reproducing an image on paper from a digital image signal, and more particularly, an image reproduction apparatus for reproducing an image on paper from a digital image signal obtained by scanning an image or from coded image data supplied from a personal computer. The present invention also relates to a method of reproducing an image and a program for causing a computer to execute the method.

2. Description of the Related Art

In recent years, a digital copying machine capable of dealing with digital image data has appeared. Furthermore, a digital multifunction device has also become popular that has not only a digital copying function, but also other additional functions, such as a facsimile function, a printer function, and a scanner function (examples of such digital multifunction devices may be found, for example, in Japanese Unexamined Patent Application Publication No. 2000-316063 or Japanese Unexamined Patent Application Publication No. 2002-116665).

The digital multifunction device disclosed in Japanese Unexamined Patent Application Publication No. 2000-316063 is an image processing apparatus in which a memory is efficiently shared by a plurality of functions, and a control mechanism including an extension unit is commonly used by the plurality of functions. That is, in this image processing apparatus, resources are used in an efficient manner. FIG. 20 is a block diagram showing an example of a structure of a conventional image processing apparatus. This image processing apparatus includes an image reading unit 1, a sensor board unit 2, an image data controller 3, an image processor 4, a video data controller 5, and an image forming unit 6. The image processing apparatus also includes a process controller 11, a RAM 12, a ROM 13, and an I/O controller 14, wherein those units are connected via a serial bus 10. The image processing apparatus also includes an image memory access controller 21, a memory module 22, and a facsimile controller 24, all of which are connected with the image data controller 3 via a parallel bus 20. The image processing apparatus further includes a system controller 31, a RAM 32, a ROM 33, and an operation control panel 34, which are connected to the image memory access controller 21.

The image reading unit 1 optically reads a document by illuminating the document with light emitted from a lamp and focusing light reflected from the document on an image sensing device (such as a CCD) disposed on a sensor board unit 2 via a mirror and a lens. The light focused on the image sensing device is converted into an electric signal by the image sensing device. The resultant electric signal is converted, in the sensor board unit 2, into a digital image signal and output from the sensor board unit 2. The image signal output from the sensor board unit 2 is input to an image data controller 3.

The image data controller 3 controls transmission of image data among the sensor board unit 2, the parallel bus 20, and the image processor 4, and the image data controller 3 also controls signal transmission between the process controller 11 and the system controller 31, which is responsible for general control over the entire apparatus.

The image signal output from the sensor board unit 2 is supplied to the image processor 4 via the image data controller 3. The image processor 4 compensates for signal degradation that occurs (in the scanner system) in an optical system and/or during a process of quantizing the signal into digital form. The resultant signal is fed back to the image data controller 3.

The image processing apparatus shown in FIG. 20 is configured to handle a job in which image data obtained by reading an image is stored in a memory and the stored image data is used later, and also a job in which image data is not stored in the memory. Those two types of jobs are described in further detail below. An example in which image data is stored in the memory is a job in which one page of document is copied on a plurality of sheets. Another example is a job in which image data obtained by operating the image reading unit 1 only once is stored in the memory module 22, and the image data stored therein is read out a plurality of times. An example in which image data is not stored in the memory is a job in which one page of document is copied on only one sheet. In this case, the image data obtained by reading the document can be directly reproduced without being stored in the memory.

In the case in which the memory is not used, the image data transmitted from the image processor 4 to the image data controller 3 is fed back to the image process 4 from the image data controller 3. In the image processor 4, the image data is subjected to image processing to convert the luminance signal generated by the CCD into an area-modulated signal. After completion of the image processing, the resultant image data is supplied from the image processor 4 to the video data controller 5. The video data controller 5 performs post processing associated with dot distribution on the area-modulated signal and controls the image forming unit 6 by a pulse control signal to reproduce dots on paper, thereby reproducing the image on the paper.

The data flow is described below for the case in which image data stored in the memory is read and subjected to additional processing such as image rotation or image mixing. In this case, image data supplied from the image processor 4 to the image data controller 3 is transferred from the image data controller 3 to the memory access controller 21 via the parallel bus 20. Under the control of the system controller 31, the memory access controller 21 performs controls storing the image data into the memory module 22, conversion of the image data into print data to be used by an external personal computer (PC) 23, and compression/decompression of the image data for the purpose of using the memory in an efficient manner.

When the memory access controller 21 receives the image data, the memory access controller 21 compresses the image data and stores the compressed image data into the memory module 22. The image data stored in the memory module 22 is read out as required. The image data read out from the memory module 22 is decompressed into the original image data and returned to the image data controller 3 via the image memory access controller 21 and the parallel bus 20. The image data supplied from the image data controller 3 to the image process 4 is subjected to image processing. Thereafter, the video data controller 5 generates a control signal in the form of a pulse, thereby controlling the image formation unit 6 in accordance with image data such that the image is reproduced on paper.

In the image processing apparatus shown in FIG. 20, after the image data is subjected to image processing performed by the image processor 4, the image data is supplied to the facsimile controller 24 via the image data controller 3 and the parallel bus 20. The facsimile controller 24 converts the received image data into facsimile data and transmits the resultant data over the communication network such as the public communication line 25. On the other hand, incoming facsimile data received via the public communication line 25 is converted into image data by the facsimile controller 24. The resultant image data is supplied to the image processor 4 via the parallel bus 20 and the image data controller 3. In this case, no particular image processing is performed by the image processor 4. The video data controller 5 performs dot redistribution and controls the image forming unit 6 by a pulse control signal so as to form a reproduced image on paper.

In the case in which a plurality of jobs, such as a copying job, a facsimile transmission/reception job, and a printer output job are performed in parallel, use, by the respective jobs, of various units such as the image reading unit 1, the image forming unit 6, and the parallel bus 20 is controlled by the system controller 31 and the process controller 11. The process controller 11 controls the flow of image data, and the system controller 31 is responsible for general control over the entire system. Use of the respective resources is controlled by the system controller 31. A function such as the copying function or the facsimile function to be executed on the digital multifunction device is specified via the operation control panel 34. The detailed operation conditions of the specified function are also set via the operation control panel 34. The system controller 31 and the process controller 11 communicate with each other via the parallel bus 20, the image data controller 3, and the serial bus 10. The image data controller 3 also performs data format conversion for the purpose of interfacing between the parallel bus 20 and the serial bus 10.

In this image processing apparatus, signals for driving various mechanical parts and signals from/to various sensors are input or output to the process controller 11 via ports under the control of the I/O controller 14. The process controller 11 monitors and processes those signals by means of interruption.

In the case in which copying is performed on only one sheet, it is not necessary to store image data in the memory module 22 via the image memory access controller 21, but it is desirable to store image data because, when a paper jam occurs in the image forming system, the image data stored in the memory module 22 can be used. Besides, if image data is not stored in the memory module 22, it is impossible to form an image on paper such that the image formed on paper is rotated with respect to the original image on a document sheet. That is, non-use of the memory module 22 results in limited use of available functions.

The image processing apparatus has the capability of outputting its operational history for convenience in maintenance of the apparatus. Historical data such as failure history, jam history, and operation history is stored in the RAM 32 or the ROM 33. When the historical data is printed out, the historical data is converted into font data on the memory module 22, and printing on paper is performed in accordance with the font data on the memory module 22. Information printed on the paper makes it possible for a service person to properly do a maintenance job. However, if the memory module 22 is not available, the service person cannot get the information, which results in inconvenience in maintenance.

Japanese Unexamined Patent Application Publication No. 2002-116665 discloses a digital multifunction device in the form of an image forming apparatus having a copying function, a facsimile function, and other functions. In this digital multifunction device, if a wrong side of a document sheet is scanned by mistake, a warning is given to inform a user that the scanned document page is blank. This prevents a blank page from being sent by mistake in facsimile transmission.

In the image processing apparatus disclosed in Japanese Unexamined Patent Application Publication No. 2000-316063, a platform includes resources that are assumed to be shared when the functions of the apparatus are extended into the form of a digital multifunction device. Therefore, when only the copying function is necessary, the apparatus includes unnecessary components, which results in an increase in cost and an increase in power consumption.

In the image forming apparatus disclosed in Japanese Unexamined Patent Application Publication No. 2002-116665, when a blank document sheet is scanned using a sheet-through document feeder, if a black streak image due to paper dust or the like on the sheet-through document feeder occurs in a resultant captured image, the blank document page is incorrectly determined as a correct page, and the page including only the black streak is copied or transmitted.

SUMMARY OF THE INVENTION

In view of the above problems with the conventional techniques, it is an object of the present invention to provide an image reproduction apparatus that allows a simple basic function to be realized at low cost, and that allows an optional unit to be added to realize an additional function. It is another object of the present invention to provide an image reproduction apparatus having, in addition to the above capabilities, capabilities of detecting invalid pixels, removing a black streak, and detecting a blank document page. It is another object of the present invention to provide a method of reproducing an image using the above apparatus. It is still another object of the present invention to provide a program for implementing the method on a computer.

In one aspect, to achieve the above objects, the present invention provides an image reproduction apparatus including an image copying function of reproducing input image data including image data obtained by reading a documents and for outputting the reproduced image data, the image reproduction apparatus comprising extension control means to which a controller board is connectable to add one or more optional units to realize one or more desired extension functions, the extension control means allowing operation control in the extension functions to be performed in the same manner as in the image copying, and also allowing image data to be input/output in the extension functions in the same format as in the image copying function, image quality retaining means for retaining the quality of an image reproduced via the extension control means at a high level similar to that of an image produced by the image copying function, operation control means for controlling operation in a similar manner regardless of whether the operation is associated with the image copying function or the one or more extension functions provided by the extension control means, resource sharing means for allowing a resource used in the image copying function is to also be used by the extension control means in inputting and/or outputting of image data, image input means for reading an image of a document and outputting image data of the document image, and image input/output control means for controlling inputting/outputting of image data depending on an output characteristic of image data output from the image input means such that the image input means inputs/outputs image data in the same form.

In this image reproduction apparatus according to the present invention, the simple image copying function can be realized at low cost, and an arbitrary optional unit can be added to realize a desired additional function. Even if the image input means is exchanged, the same format of input/output image data can be used.

Preferably, the image reproduction apparatus according to the present invention further comprises line decimation control means for converting the resolution of the image data, and pixel loss compensation means for compensating for a loss of pixel information caused by line decimation.

In this image reproduction apparatus according to the present invention, the resolution of image data output from the image input means can be changed using a simple configuration without causing a significant loss of pixel information.

The image reproduction apparatus according to the present invention may further comprise data format conversion means for converting a data format of image data such that transmission and reception of image data to and from the extension control means is performed in the same manner regardless of whether the image data is color image data or monochrome image data.

In this image reproduction apparatus according to the present invention, transmission and reception of image data to and from the extension control means can be performed in the same manner regardless of whether the image data is color image data or monochrome image data.

In the image reproduction apparatus according to the present invention, the line decimation control means may divide a control signal specifying a reading line into a plurality of control signals and may divide a single functional module into a plurality of functions thereby controlling a density conversion.

In this image reproduction apparatus according to the present invention, line decimation for conversion of the resolution can be performed in an efficient manner.

In the image reproduction apparatus according to the present invention, the image input means may be a contact image sensor or a charge coupled device.

This image reproduction apparatus according to the present invention can handle the difference in output form between color images and monochrome images.

The image reproduction apparatus according to the present invention may further comprise sequential line discrimination/control means for, when color image data is input using a contact image sensor as the image input means, detecting the color of image data currently being transmitted and processed and for controlling a reading of a plurality of data lines at a time on a color-by-color basis.

In this image reproduction apparatus according to the present invention, when image data is input, controlling of reading lines can be performed in a similar manner regardless of the image data is color image data or monochrome image data.

In the image reproduction apparatus according to the present invention, the line decimation control means may perform decimation in an optimum manner and the pixel loss compensation means may perform compensation in an optimum manner depending on whether image data is color image data or monochrome image data.

In this image reproduction apparatus according to the present invention, compensation for the loss of pixel information caused by the line decimation can be performed by the same single compensation mechanism regardless of whether the image data is color image data or monochrome image data.

In another aspect, the present invention provides an image reproduction apparatus including, an image copying function for reproducing input image data including image data obtained by reading a document and outputting the reproduced image data, the image reproduction apparatus comprising extension control means to which a controller board is connectable to add one or more optional units to realize one or more desired extension functions, the extension control means allowing operation control in the extension functions to be performed in the same manner as in the image copying function and allowing image data to be input/output in the extension functions in the same format as in the image copying function, image quality retaining means for retaining the quality of an image reproduced via the extension control means at a high level similar to that of an image produced by the image copying function, operation control means capable for controlling operation in a similar manner regardless of whether the operation is associated with the image copying function or the one or more extension functions provided by the extension control means, resource sharing means for allowing a resource used in the image copying function is to also be used by the extension control means in inputting and/or outputting of image data, line decimation control means for converting resolution of the image data, pixel loss compensation means for compensating for a loss of pixel information caused by line decimation, invalid pixel detection means for detecting an invalid pixel that causes a streak image in an image read using a sheet-through document feeder, streak image correction means for correcting the streak image, and warning means for warning of the occurrence of the invalid pixel.

This image reproduction apparatus according to the present invention has, in addition to the advantages that the simple image copying function is realized at low cost and an arbitrary optional unit can be added to realize a desired additional function, an additional advantage that invalid pixels are detected and a black streak caused by invalid pixels is corrected. When invalid pixels occur, a warning of the occurrence of invalid pixels is given.

The image reproduction apparatus according to the present invention may further comprise history recording means for recording a history of the occurrence of an invalid pixel detected by the invalid pixel detection means, blank document page detection means for detecting a blank document page, blank document page warning means for determining whether a read document page is blank based on the history of invalid pixel occurrence recorded by the history recording means and the result of detection made by the blank document page detection means, and warning, if the read document page is determined to be blank, that the read document is blank, and reading job control means for controlling outputting of a document read in a reading job, in accordance with the result of the determination made by the blank document page warning means.

This image reproduction apparatus according to the present invention has, in addition to the advantages that the simple image copying function is realized at low cost and an arbitrary optional unit can be added to realize a desired additional function, an additional advantage that a blank document page is detected, a warning of an occurrence of a blank document page is generated, and outputting of a reading job is controlled depending on whether a blank document page occurs.

In the image reproduction apparatus according to the present invention, the invalid pixel detection means may read a background plate of the sheet-through document feeder and may detect the sizes of invalid pixels and the total number of invalid pixels.

In this image reproduction apparatus according to the present invention, when an image is read using a sheet-through document feeder, the sizes of invalid pixels and the total number of invalid pixels can be detected.

In the image reproduction apparatus according to the present invention, the invalid pixel detection means may manage the history of occurrence of detected invalid pixels and may record the history as invalid pixel occurrence information on detection result recording means.

In this image reproduction apparatus according to the present invention, the history of occurrences of invalid pixels is managed and recorded.

In the image reproduction apparatus according to the present invention, the blank document page detection means may detect a blank document page by dividing one page of read document image into a plurality of blocks, detecting the total number of invalid pixels and the number of invalid pixels at successive locations in each block, and calculate the sums of the numbers over all blocks.

In this image reproduction apparatus according to the present invention, detection of a blank document page can be performed in a highly reliable fashion.

In the image reproduction apparatus according to the present invention, the blank document page detection means may detect a blank document page by dividing one page of read document image into a plurality of blocks, detect the total number of invalid pixels and the number of invalid pixels at successive locations in each block, calculate the sums of the numbers over all blocks, determine from the calculated sums a streak image that is predicted to occur, subtract a streak image component caused by successively located invalid pixels from the document image data, thereby predicting the real state of the document, and determine from the predicted real state whether the document page is a blank document page or a document page including a streak image.

In this image reproduction apparatus according to the present invention, it is possible to correctly determine whether a document page of interest is a blank document page or a document page including a streak image.

In the image reproduction apparatus according to the present invention, the blank document page detection means may manage information indicating whether document pages read in the reading job are blank, in units of document pages, and may record the information as blank document page detection information on detection result recording means.

In this image reproduction apparatus according to the present invention, it is possible to easily manage the information associated with blank document pages.

In the image reproduction apparatus according to the present invention, the detection result recording means may include nonvolatile storage means.

In this image reproduction apparatus according to the present invention, it is possible to easily manage the information associated with the result of detection made by the invalid pixel detection means and the blank document page detection means.

The image reproduction apparatus according to the present invention may further comprise display means for displaying the results of detection made by the invalid pixel detection means and the blank document page detection means.

In this image reproduction apparatus according to the present invention, a user can easily recognize the results of detection of invalid pixels and/or blank document pages.

The image reproduction apparatus according to the present invention may further comprise image output means for outputting, on paper, the results of detection made by the invalid pixel detection means and the blank document page detection means.

In this image reproduction apparatus according to the present invention, it is possible to record, on paper, the results of detection made by the invalid pixel detection means and the blank document page detection means.

In the image reproduction apparatus according to the present invention, the results of detection made by the invalid pixel detection means and the blank document page detection means may be transmitted to an external apparatus via communication means connected to the extension control means.

In this image reproduction apparatus according to the present invention, the results of detection made by the invalid pixel detection means and the blank document page detection means can be recognized by an external apparatus at a remote location.

In another aspect, the present invention provides an image reproduction method of reproducing input image data such as that obtained by reading a document and outputting the reproduced image data, the method comprising controlling inputting/outputting of image data depending on an output characteristic of image data output from image input means such that the image input means is allowed to input/output image data in the same form.

In this image reproduction method according to the present invention, even if the image input means is exchanged, the same format of input/output image data can be used.

The image reproduction method according to the present invention may further comprise converting the resolution of the image data, and compensating for a loss of pixel information caused by line decimation.

In this image reproduction method according to the present invention, the resolution of image data output from the image input means can be changed using a simple configuration without causing a significant loss of pixel information.

The image reproduction method according to the present invention may further comprise the step of converting a data format of image data such that outputting of image data is performed in the same manner regardless of whether the image data is color image data or monochrome image data.

In this image reproduction method according to the present invention, transmission and reception of read image data can be performed in the same manner regardless of whether the image data is color image data or monochrome image data.

In another aspect, the present invention provides an image reproduction method comprising an image reading step of reading an image, an invalid pixel detection step of detecting an invalid pixel from the image read in the image reading step, a maximum invalid pixel width detection step of detecting a maximum width of invalid pixels detected in the invalid pixel detection step, a number-of-bad-pixels detection step of detecting the number of invalid pixels detected in the invalid pixel detection step, an invalid pixel location detection step of detecting the location, on a document, of each invalid pixel detected in the invalid pixel detection step, a streak image prediction step of predicting an occurrence of a streak image in a document image from the results of detection made in the maximum invalid pixel width detection step, the number-of-bad-pixels detection step, and the invalid pixel location detection step, and a streak image correction step of correcting the streak image in the document image on the basis of the result of the prediction made in the streak image prediction step.

In this image reproduction method according to the present invention, it is possible to detect a black streak image and correct it.

In another aspect, the present invention provides an image reproduction method comprising an image reading step of reading an image, a divide-into-blocks step of dividing the image into blocks with a predetermined block size, an invalid pixel detection step of detecting the total number of invalid pixels and the number of invalid pixels at successive locations in each of blocks produced in the divide-into-blocks step, and a blank document page detection step of detecting a blank document page by calculating the sums of the numbers detected for respective blocks in the invalid pixel detection step.

In this image reproduction method according to the present invention, it is possible to detect a blank document page in a highly reliable fashion.

In another aspect, the present invention provides an image reproduction method comprising an image reading step of reading an image, a divide-into-blocks step of dividing the image into blocks with a predetermined block size, an invalid pixel detection step of detecting the total number of invalid pixels and the number of invalid pixels at successive locations in each of blocks produced in the divide-into-blocks step, a blank document page determination step of determining whether a document page is blank or not, by determining a streak image which is predicted to occur, from the results of detection made in the invalid pixel detection step in terms of the total number of invalid pixels and the number of invalid pixels at successive locations in respective blocks, and subtracting a streak image component caused by successively located invalid pixels from the document image data thereby predicting the real state of the document, and determining from the predicted real state whether the document page is a blank document page or a document page including a streak image.

In this image reproduction method according to the present invention, it is possible to correctly determine whether a document page of interest is a blank document page or a document page including a streak image.

In another aspect, the present invention provides a program for causing a computer to execute a method according to one of the aspects described above.

This program according present invention makes it possible to perform image processing in an efficient manner by executing the method according to one of the aspects described above.

BRIEF DESCRIPTION OF THE DRAWINGS

A more complete appreciation of the invention and the many attendant advantages thereof will be readily obtained as the same becomes better understood by reference to the following detailed description when considered in connection with the accompanying drawings, wherein:

FIG. 2 is a block diagram showing a structure of a video controller;

FIGS. 9A to 9C are diagrams illustrating line decimation in a sub scanning direction;

FIGS. 10A to 10D are diagrams illustrating the line-sequential control of a color CIS;

DETAILED DESCRIPTION OF THE PREFERRED EMBODIMENTS

Figure 1A:
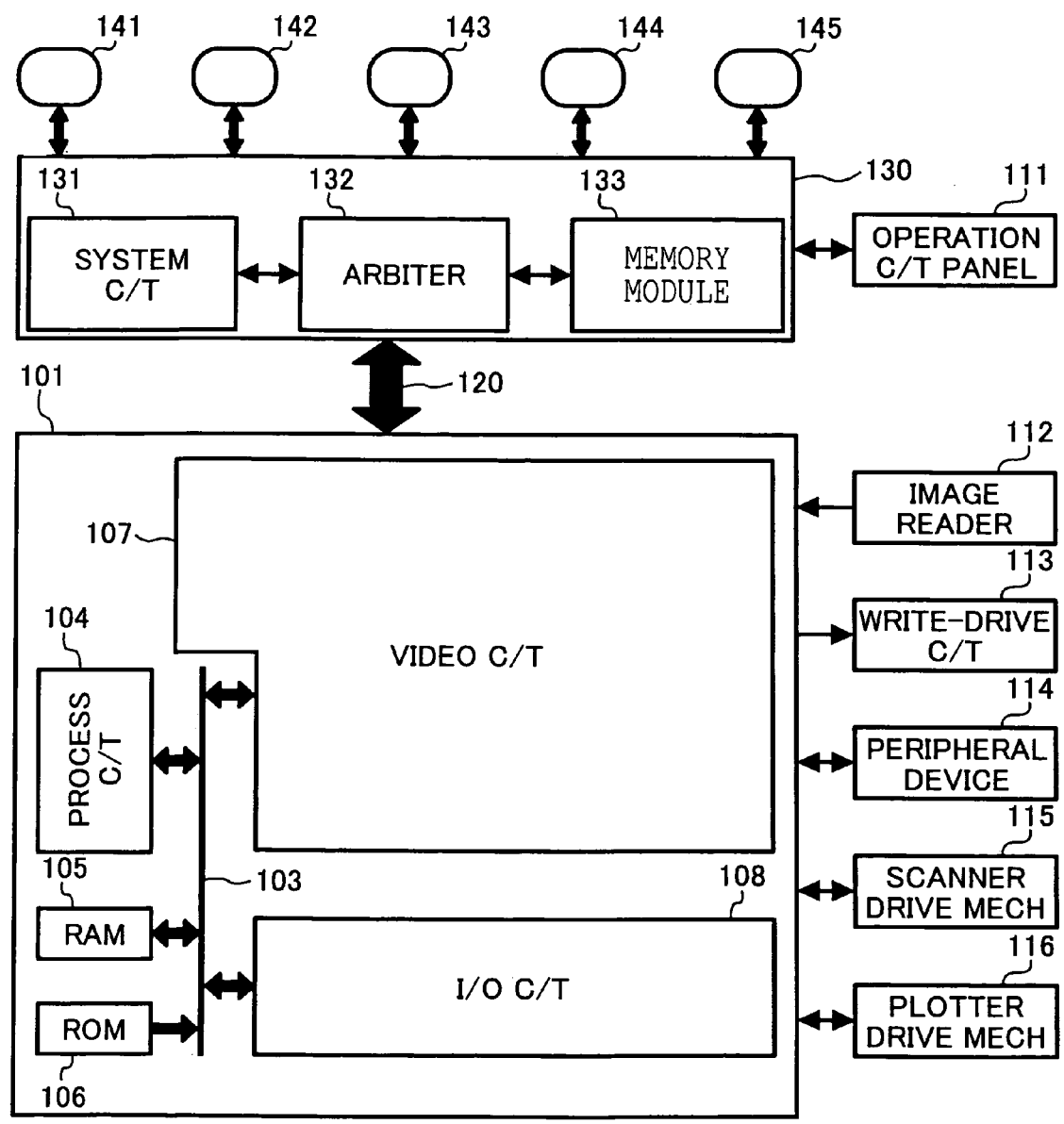
FIGS. 1A and 1B are block diagrams showing exemplary structures of an image reproduction apparatus according to an embodiment of the present invention.
Figure 1B:
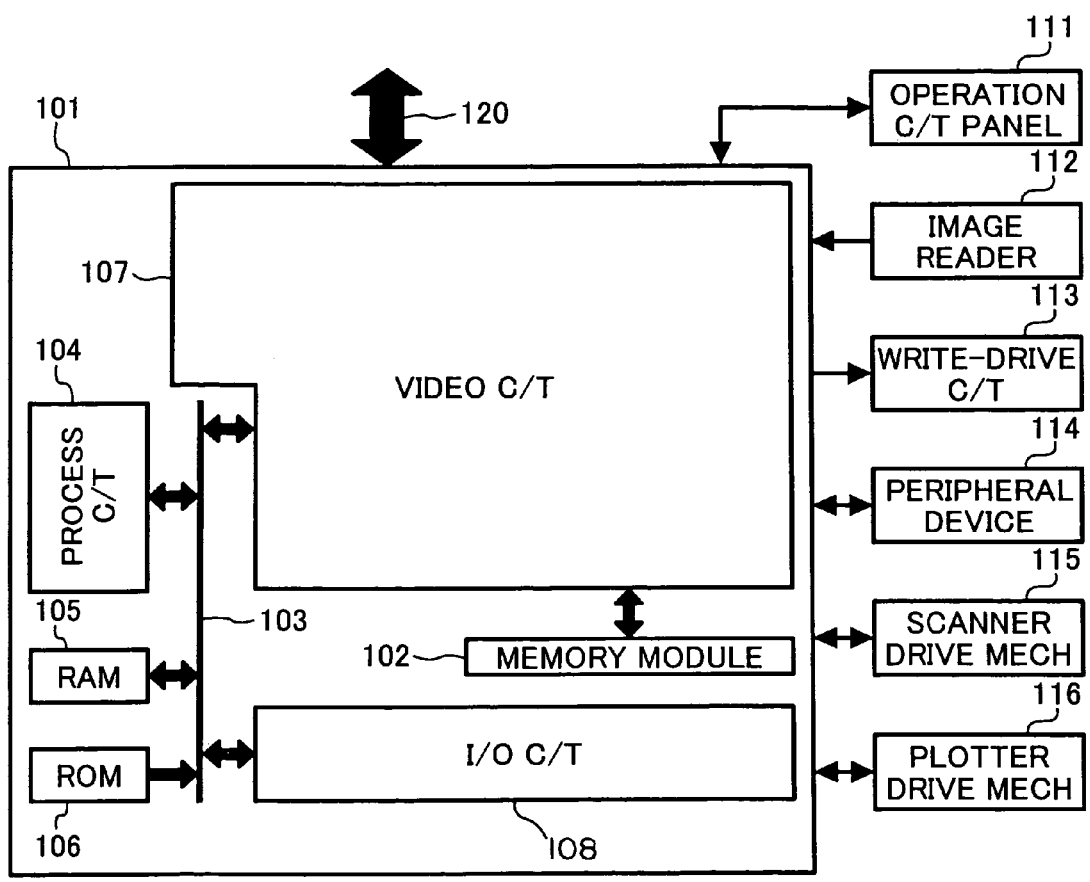

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 1A and 1B, an image reproduction apparatus according to an embodiment of the present invention is explained. FIG. 1A shows an image reproduction apparatus having multiple digital functions, and FIG. 1B shows an image reproduction apparatus having only the copying function. In the image reproduction apparatus having only the copying function shown in FIG. 1B, a memory module 102 for storing image data can be mounted on a base engine/image data controller 101. The image reproduction apparatus provides all basic functions necessary in a digital copying machine, including an image rotation capability, an electronic sorting capability, and a capability of outputting historical information. A DIMM may be used as the memory module 102 disposed on the base engine/image data controller 101. When the memory module 102 is not necessary, it can be removed from the base engine/image data controller 101 and may be used as a memory module 133 on the controller board 130, as shown in FIG. 1A. This allows an effective use of the resource, although removal and mounting of the memory module is not performed automatically, but must be performed manually.

First, the image reproduction apparatus having only the copying function shown in FIG. 1B is described. In this configuration, the image reproduction apparatus provides only a basic copying function but does not provide digital multiple functions, such as a facsimile function, a printer function, and/or a network connection function. However, the image reproduction apparatus includes a function extension I/F that allows the image reproduction apparatus to be easily extended so as to operate as a digital multifunction apparatus.

The base engine/image data controller 101 includes a local CPU bus 103. Via this CPU bus 103, various devices are connected with each other. They include a process controller 104, a RAM 105 used as a work area, a ROM 106 in which operation commands are stored, a video controller 107 that processes image data and controls the flow of image data, and a I/O controller 108 that monitors and controls I/Os of various devices such as drivers or sensors. All units in FIG. 1B are under the control of process controller 104. The memory module 102 for storing image data is connected with the video controller 107.

Access to the memory module 102 for storing image data is controlled by the video controller 107. The base engine/image data controller 101 is connected with basic units including an operation control panel 111, an image reader 112, a write drive controller 113, a paper input/output (peripheral) device 114, a scanner drive mechanism 115, and a plotter drive mechanism 116.

The image reader 112 may be an image reader using a CCD or a color contact image sensor (CIS), which are different in sensor structure. When a low-cost color scanner is desirable, a color CIS is used. In this case, only a scanner application is provided as an extension function. In the case in which a color CIS is employed, when a document image is read, each line of the document image is separated into 3 colors, that is, green, blue, and red, and image data is output in the form of a line-sequential stream.

The operation control panel 111 is connected with the process controller 104 via a serial port of a CPU periphery controller (described later) disposed in the video controller 107. When an operation is performed by a user on the operation control panel 111, a command or data given by the user via the operation control panel 111 is transferred to the process controller 104 via the video controller 107 and is processed by the process controller 104. Conversely, information to be displayed on the operation control panel 111 is given by the process controller 104 via the video controller 107. In accordance with a given command input via the operation control panel 111, the process controller 104 monitors and/or controls the respective functional units via the I/O controller 108.

For example, in a copying operation, the process controller 104 controls the scanner drive mechanism 115 such that a document is optically read by the image reader 112, and a digital image signal is sent to the video controller 107. The digital image signal is processed by a read image processor (described later) in the video controller 107, and resultant image data is stored in the memory module 102. It is desirable to store image data for the purpose of backup to provide for a paper jam, regardless of whether only one sheet or a plurality of documents are copied. The image data is read from the memory module 102 and subjected to smoothing or PWM modulation performed by a write-image processor of the video controller 107, and the resultant image data is sent to the write drive controller 113. The write drive controller 113 forms an image by driving a laser diode (LD) to emit a laser beam therefrom while moving the plotter driving mechanism 116. The image is transferred to paper that is fed, transported, and ejected by the paper input/output device 114. Post processing, such as stapling, is also performed by the paper input/output device 114.

The base engine/image data controller 101 also includes a terminal for connection with a parallel bus 120, although the parallel bus 120 is not necessary, as long as only the basic function is used. That is, when only the copying function is used, nothing is connected to the terminal of the parallel bus 120.

Now, the image reproduction apparatus having multiple digital functions shown in FIG. 1A is described. A mother board serving as a controller board 130 is connected with the base engine/image data controller 101 via the parallel bus 120. The controller board 130 includes a system controller 131 for monitoring and controlling the image reproduction apparatus, an arbiter 132 that arbitrates use of resources shared by a plurality of applications, a memory module 133 for storing image data, and terminals for connection with a plurality of optional units (applications 141 to 145). For the purpose of extension of functions, optional units can be connected independently without having any restriction on the order of connection. In the present image reproduction apparatus, unlike the image reproduction apparatus having only the copying function, the operation control panel 111 is one of the resources shared by the plurality of applications, and thus the operation control panel 111 is monitored and controlled by the system controller 131 via the arbiter 132.

The basic functions controlled by the process controller 104 are referred to as engines. The engines are extended by connecting the controller board 130 and additional applications are installed on the controller board 130, thereby realizing a digital multifunction device. The multiple digital functions realized herein are controlled by the system controller 131. The operation of each engine is performed in a similar manner to the apparatus shown in FIG. 1B. In this case, the resources are assigned by the system controller 131 and the process controller 104 that communicate with each other via the parallel bus 120. When the image reproduction apparatus is formed as a digital multifunction device, instead of the memory module 102 in the base engine/image data controller 101, a memory module 133 disposed on the controller board 130 is used.

Specific examples of additional applications, which are installable to extend the functions, include a facsimile function, a printer function, a network filing function, a scanner function, a local storage function (an image storage function), a document storage function, and/or a document distribution function. The copying function is one of the functions realized by applications.

Communication via the network and access to the memory module 133 are controlled by the arbiter 132 such that resources are properly assigned to applications. When two or more functions are simultaneously used, the system controller 131 and the process controller 104 properly assign right of use of engine resources, wherein the scanner resource and the plotter resource are assigned separately. The additional functions realized by add-on engines are controlled by the system controller 131 such that the functions of the digital multifunction device are realized without causing concentration of load on a particular function.

FIG. 2 is a block diagram showing a structure of the video controller 107. The image data output from the image reader 112 is supplied to the read image processor 201 and subjected to correction process. The processing performed herein on the image data by the read image processor 201 includes shading correction, MTF correction, density conversion, binarization, and scaling up/down. The processing may be performed by either high-speed hardware or a programmable processor. A bus controller 202 controls a data flow. More specifically, under the control of the process controller 104, the bus controller 202 controls inputting/outputting of data via a parallel bus I/F 203, connection of the bus to the data converter 206, and connection of the bus to a write-image processor 205. The write-image processor 205 converts a signal input thereto into a signal by which to drive a device. In the conversion, the write-image processor 205 performs image processing such as jaggy correction, density conversion, PWM modulation, and image trimming. After completion of the processing, the resultant data is supplied from the write-image processor 205 to the write drive controller 113. The write drive controller 113 forms an image by driving a laser diode to emit a laser beam therefrom while moving the plotter driving mechanism 116.

The data converter 206 separates image data and command data from each other. The command data is supplied to a CPU serving as the process controller 104 via the CPU periphery controller 207. In the image reproduction apparatus extended in the form of a digital multifunction device, the command is transferred to the system controller 131 and executed thereby.

On the other hand, the image data is encoded by a data compressor 208 and the resultant coded image data is transferred to the memory module 102 via a memory access controller 209 and stored in the memory module 102. When data is read from the memory module 102, coded data stored at a particular address of the memory module 102 is read under the control of the memory access controller 209, and the read data is decoded by a data decompressor 210 into image data. When rotation is performed on image data, the decoded image data is re-saved into the memory module 102 without being encoded and the saved image data is re-read. When the image data is re-read, the address from which image data is re-read is properly changed such that the image data is rotated.

The read image processor 201 performs pixel density conversion required in a facsimile application, a scanner application, or a similar application. The pixel density conversion in the main scanning direction is performed via a scaling-down process. On the other hand, the pixel density conversion in the sub scanning direction is performed by a line decimation controller 211 such that the number of lines is converted to obtain a desired line. density. For example, in a case in which a document image read by the image reader 112 has a pixel density of 600 dpi and a facsimile image is to be sent in 200 dpi according to the facsimile specification, it is required to convert the pixel density into 200 dpi to meet the facsimile specification. In this specific example, the pixel density is converted by a factor of ⅓.

In the case in which the color CIS is used, a sequential line discriminator/controller 212 determines the color of image data being currently output from the color CIS and being subjected to processing, and the line-sequential image data is stored in the memory module 133 on the controller board 130 such that G, B, and R plane data are separately stored. When image data is read from the memory module 133 and supplied to a scanner application or to an external color printer, the image data is processed and output in units of color planes. In this case, before image data is sent over the parallel bus 120 under the control of the bus controller 202, the data format thereof is converted by a data format converter 204. More specifically, data indicating an address, at which to store the data, of the memory module 133 controlled by the controller board 130, is added at the head of each line data.

Figure 3:
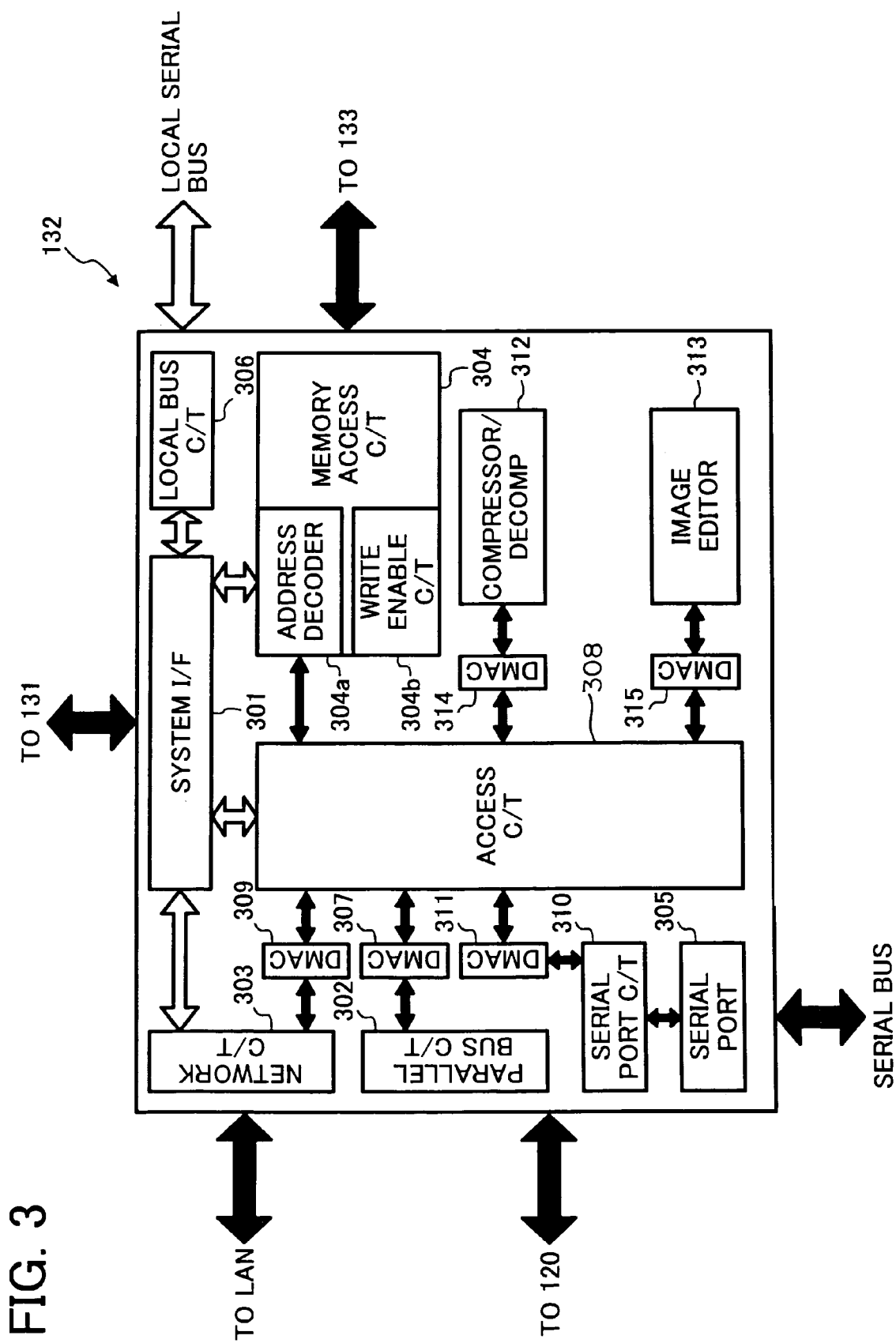
FIG. 3 is a block diagram showing a structure of an arbiter.

FIG. 3 is a block diagram schematically showing a structure of the arbiter 132 on the controller board 130. Commands and data are sent between the system controller 131 and the arbiter 132 via a system I/F 301. Basically, the system controller 131 is responsible for control over the entire apparatus, and the assignment of resources of the memory module 133 is also performed under the control of the system controller 131. The units added for the purpose of function extension are controlled by the system controller 131 via the system I/F 301, the parallel bus controller 302, and the parallel bus 120.

All units of the image reproduction apparatus are basically connected to the parallel bus 120, and thus transmission of data between any unit and the system controller 131 or the memory module 133 is performed via the parallel bus 120, wherein use of the parallel bus 120 by units is controlled by the parallel bus controller 302.

A network controller 303 controls the connection of a LAN (Local Area Network) and controls transmission/reception of data to/from an external extension device connected via the network. The system controller 131 is not concerned with the control of the operation of the external device connected via the network. However, the system controller 131 controls interfacing with the memory access controller 304. The image reproduction apparatus according to the present embodiment supports 100BT transmission. Connection with serial buses are interfaced by serial ports 305. The serial ports 305 include as many ports as there are different types of buses connected to the arbiter 132. In the image reproduction apparatus according to the present embodiment, the serial ports 305 include a USB port and an IEEE1284 port. In addition to those serial ports for connection with external devices, there is a port via which to receive commands sent from the operation control panel 111 and transmit data to be displayed on the operation control panel 111.

A local bus controller 306 controls interfacing with a local serial bus via which a RAM and a ROM necessary to start the system controller 131 and a font ROM (not shown), in which printer code data is stored, are connected.

Connection with the memory module 133 is controlled by the memory access controller 304. The memory access controller 304 includes an address decoder 304a and a write enable controller 304b. When data received from the video controller 107 is written into the memory module 133, the address decoder 304a determines the address at which to write the data, and the write enable controller 304b generates a write enable signal. In accordance with this signal, the data is written into the memory module 133. When data is read from the memory module 133, the memory access controller 304 generates address data indicating the address from which to read the data and also generates a read enable signal.

In the case in which the color CIS is used as the image reader 112, when each color data of each line is output from the video controller 107, information specifying the address at which to store data in the memory module 133 is described as header information in the data output from the video controller 107. The header information is decoded and the enabling of writing of image data into the memory module 133 is controlled thereby storing line-sequential image data in the memory module 133, in units of color planes.

Thus, the arbiter 132 controls transmission, via the system I/F 301, of operation control commands issued by the system controller 131, and the arbiter 132 also controls the data access from external units to the memory module 133. Image data output from base engine/image data controller 101 via the parallel bus 120 is supplied to the arbiter 132 via the parallel bus controller 302. In the arbiter 132, memory accessing associated with the image data is controlled by a DMAC (Direct Memory Access Controller) 307 independently of the system controller 131, without being controlled by the system controller 131. More specifically, as for accessing to the memory module 133, access requests issued by a plurality of units are arbitrated by an access controller 308, and data is read or written from or into the memory module 133 under the control of the memory access controller 304.

Also, access to the memory module 133 via the network is controlled in a similar manner. More specifically, data transmitted via the network is input to the arbiter 132 via a network controller 303, and access to the memory module 133 is performed under the control of a DMAC 309. Requests for accessing to the memory module 133, issued in a plurality of jobs, are arbitrated by the access controller 308, and reading/writing of data is performed under the control of the memory access controller 304. In the case of accessing to the memory module 133 via the serial bus, data is received by the serial port 305 under the control of the serial port controller 310 and captured by the arbiter 132. Thereafter, access to the memory module 133 is performed via a DMAC 311. When requests for access to the memory module 133 occur in a plurality of jobs, requests are arbitrated by the access controller 308 and then reading/writing of data is performed under the control of the memory access controller 304. When data to be printed is received from a PC (Personal Computer) via the network or the serial bus, the data is converted by the system controller 131 in accordance with font data supplied via the local bus, and the resultant data is stored in a memory area of the memory module 133.

Interfacing with the respective external units is controlled by the system controller 131, and access to the memory module 133 is controlled by the corresponding DMAC. In this case, because the respective DMACs try to transfer data independently, a conflict associated access to the memory module 133 can occur between different jobs. To avoid the conflict, the access controller 308 arbitrates among the access requests. In addition to access to the memory module 133 via the DMACs, access the memory module 133 occurs when the system controller 131 accesses to the memory module 133 via the system I/F 301 in order to obtain bitmap data. After permission to access the memory module 133 via one of the DMACs or via the system I/F 301 is granted by the access controller 308, access to the memory module 133 is performed under the control of the memory access controller 304.

In the arbiter 132, data is processed by a compressor/decompressor 312 and an image editor 313. The compressor/decompressor 312 compresses or decompresses image data or code data such that the image data or the coded data is stored in the memory module 133 in an efficient manner. Interfacing between the compressor/decompressor 312 and the memory module 133 is controlled by a DMAC 314. More specifically, image data temporarily stored in the memory module 133 is transferred to the compressor/decompressor 312 via the memory access controller 304 and the access controller 308 under the control of the DMAC 314, and the data is compressed or decompressed by the compressor/decompressor 312. The compressed or decompressed data is returned to the memory module 133 or output over the external bus.

The image editor 313 edits data stored in the memory module 133 by accessing to the memory module 133 via a DMAC 315. Editing performed by the image editor 313 includes clearing of data in a particular memory area, rotation of image data, and combining of two or more images. Editing of data is accomplished by properly controlling addresses on the memory module 133 such that the data is converted into a desired form. This cannot be applied to data coded into a compressed form or coded printer data. Editing can be performed only on data stored in the form of bitmap image data in the memory module 133. Therefore, compression of image data into a form that allows the image data to be stored in an efficient manner is performed after the completion of editing.

Figure 4:
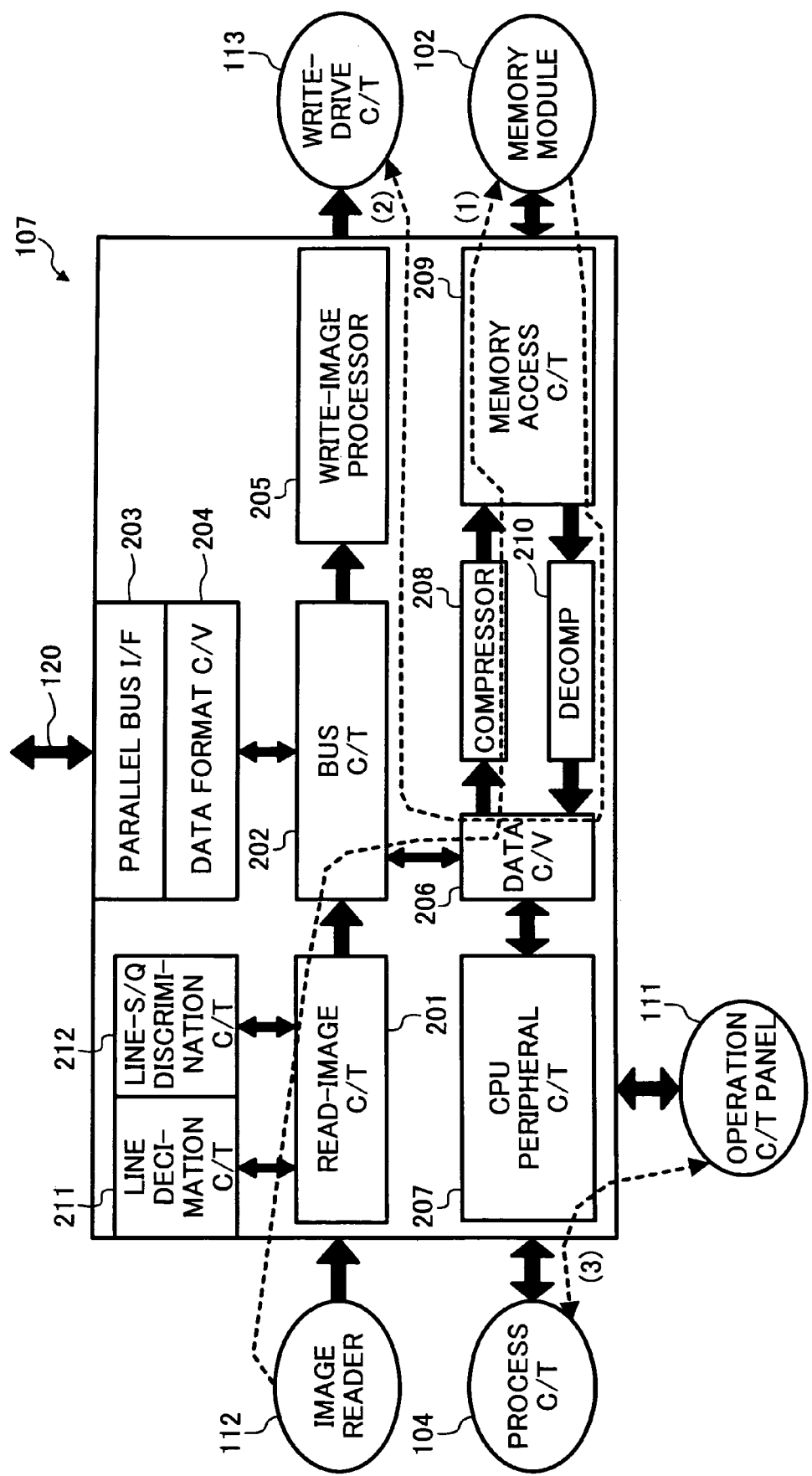
FIG. 4 is a diagram illustrating an operation of an image reproduction apparatus having only a copying function.

The operation of the image reproduction apparatus having only the copying function is described. FIG. 4 is a diagram illustrating the operation of the image reproduction apparatus having only the copying function. In the operation, document image data output from the image reader is transferred to the memory module 102 via a path denoted by (1) in FIG. 4, and data is read from the memory module 102 and output via a path denoted by (2). Data from/to the operation control panel 111 is transferred via a path denoted by (3). In this case, no additional functions for extension are implemented, and thus the controller board 130 is not connected to the base engine/image data controller 101, and data transmission via the parallel bus 120 does not occur. In this configuration, the memory module 102 on the base engine/image data controller 101 is used as a memory for storing image data.

Data transmission via the reading path (1) and associated operations are described below. After a document image is optically read by the image reader 112 and converted into an electrical signal, the resultant image data is supplied to the read image processor 201 and subjected to image processing. After completion of the image processing, the image data is supplied from the read image processor 201 to the data converter 206 via the bus controller 202. On receiving the image data, the data converter 206 selects the bus to the data compressor 208 and transfers the image data to the compressor 208 to encode the image data. The data compressor 208 encodes the received image data into a compressed form in which redundancy of data is removed. The resultant encoded image data is stored, via the memory access controller 209, at a particular address of the memory module 102. The memory module 102 is attachable/detachable, and the memory capacity can be increased or decreased as required. The memory access controller 209 is capable of controlling accessing to the memory module 102 when the memory size is set below the maximum allowable size.

Data transmission via the outputting path (2) and associated operations are described below. Coded data stored in the memory module 102 is read from an address specified by the memory access controller 209. The coded data is then decoded into image data by the data decompressor 210. Thereafter, the data converter 206 transfers the image data to the bus controller 202. The bus controller 202 transfers the received image data to the write-image processor 205 to convert the data into data in a form to be written. The write-image processor 205 converts the signal stored in the memory module into a form by which to drive a device. Furthermore, image processing is performed. Thereafter, the resultant image data is transferred to the write drive controller 113. The write drive controller 113 forms an image by driving a laser diode to emit a laser beam therefrom while moving the plotter driving mechanism 116. The image is transferred to paper that is fed, transported, and ejected by a paper input/output device 114. Post processing such as stapling is also performed by the paper input/output device 114. Although it is assumed by way of example that, in the image reproduction apparatus according to the present embodiment, the image formation is performed by means of an electrophotographic process in which a latent image is formed by the laser diode and transferred to paper, the image information may also be performed by another process such as an ink-jet process in which an image is formed by emitting ink droplets in accordance with the electrical signal.

Displaying of data on the operation control panel 111 and accepting of data via the operation control panel 111 are performed by the process controller 104 via the CPU periphery controller 207 (via the path (3) shown in FIG. 4). Because the present image reproduction apparatus is configured so as to have only the copying function, it is necessary to display information or accept commands associated with only operation or maintenance of copying functions, and thus the process controller 104 does not need to manage operations associated with optional extended functions. Therefore, it is sufficient if the operation control panel 111 has minimal capabilities necessary to control the basic functions. For example, the display area can be reduced because a menu to be displayed includes a small number of items, and it is not necessary to dispose buttons or the like used to specify a facsimile address, for example.

Figure 5:
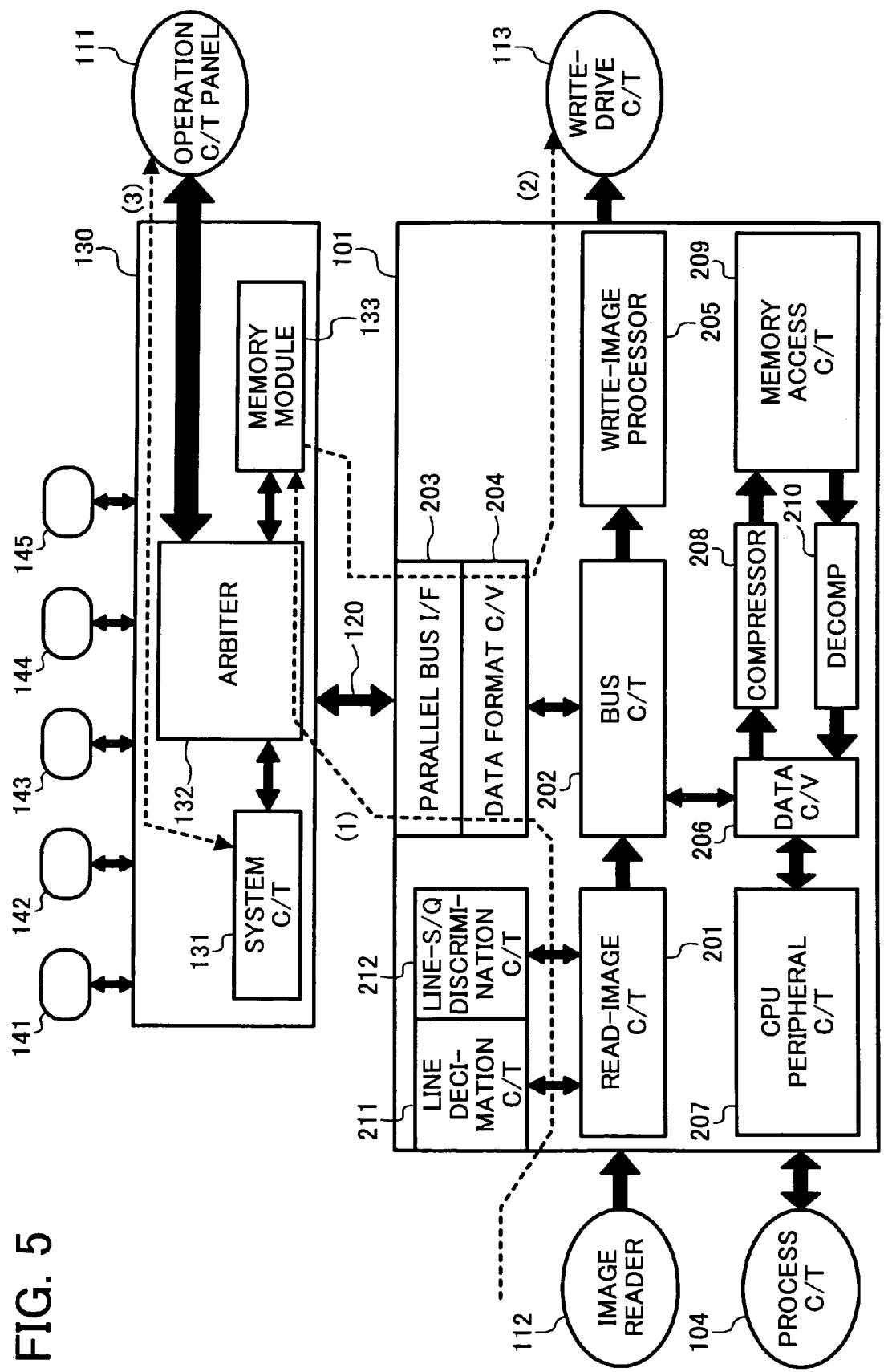
FIG. 5 is a diagram illustrating an operation of an image reproduction apparatus having multiple digital functions.

Now, the operation of the image reproduction apparatus having multiple digital functions is described. FIG. 5 is a diagram illustrating the operation of the image reproduction apparatus having multiple digital functions. The controller board 130 is connected to the base engine/image data controller 101 via the parallel bus 120, and various application functions are connected to the controller board 130, which serves as the extension mother board. The system controller 131 on the controller board 130 is responsible for general control over the entire image reproduction apparatus, and the process controller 104 is dedicated to controlling of engines. The operation control panel 111 is used in all functions including the copying application, wherein displaying of data on the operation control panel 111 and accepting of commands input via the operation control panel 111 are controlled by the system controller 131. The memory module for storing image data is not disposed on the base engine/image data controller 101, but is disposed as the memory module 133 on the controller board 130 such that the memory module 133 can be used as a shared resource. In the operation, document image data output from the image reader is transferred to the memory module 133 via a path denoted by (1) in FIG. 4, and data is read from the memory module 133 and output via a path denoted by (2). Data from/to the operation control panel 111 is transferred via a path denoted by (3).

Data transmission via the image reading path (1) and associated operations are described below. After a document image is optically read by the image reader 112 and converted into an electrical signal, the resultant image data is supplied to the read image processor 201 and subjected to image processing. After completion of the image processing, the image data is supplied from the read image processor 201 to the parallel bus 120 via the bus controller 202 and the parallel bus I/F 203. When data is stored into the memory module 133 on the controller board 130 via the parallel bus 120, data is transferred via the arbiter 132. In the arbiter 132, the data is processed by modules therein such as the parallel bus controller 302, the access controller 308, the compressor/decompressor 312, and the memory access controller 304, and the data is stored in the form of coded data into the memory module 133.

Data transmission via the outputting path (2) and associated operations are described below. Coded data stored in the memory module 133 on the controller board 130 is read under the control of the memory access controller 304 in the arbiter 132. The read data is processed by the access controller 308, the compressor/decompressor 312, and the parallel bus controller 302, and the data is output as decoded image data over the parallel bus 120. In the base engine/image data controller 101, the image data output from controller board 130 is received by the parallel bus I/F 203. The received data is transferred to the write-image processor 205 via the bus controller 202. In the write-image processor 205, the data is subjected to smoothing processing and PWM modulation, and the resultant data is transferred to the write drive controller 113. The write drive controller 113 drives a laser diode so as to emit a laser beam therefrom in accordance with the data while moving the plotter driving mechanism 116, thereby producing a latent image, which is then developed, transferred onto paper, and fused. As a result, the image is reproduced on the paper.

The control of the operation control panel 111 via the path (3) is described. Displaying of data on the operation control panel 111 and accepting of a command/data via the operation control panel 111 is performed by the system controller 131 on the controller board 130 via the local bus controller 306 and the system I/F 301 in the arbiter 132. It is desirable that the capability of the display of the operation control panel 111 be extended to make it possible to use a plurality of optional functions. For example, preferably, the display of the operation control panel 111 has a display panel with a large enough size, and other additional units corresponding to the optional functions. More specifically, a mechanism of inputting an address on the network and/or buttons for specifying a facsimile address are added to the display.

In the image reproduction apparatus shown in FIG. 5, the memory module 102 on the base engine/image data controller 101 is not used, and thus data is not transferred to the data compressor 208, the data decompressor 210, and the memory access controller 209 in the video controller 107. The bus controller 202 controls the data flow between the parallel bus I/F 203 and the data converter 206, depending on whether the image reproduction apparatus is in the basic configuration or the extended configuration. The process controller 104 is not concerned with displaying data on the display of the operation control panel 111 and inputting command data via the operation control panel 111, and thus any command is transferred to the CPU periphery controller 207 from the operation control panel 111.

Figure 6:
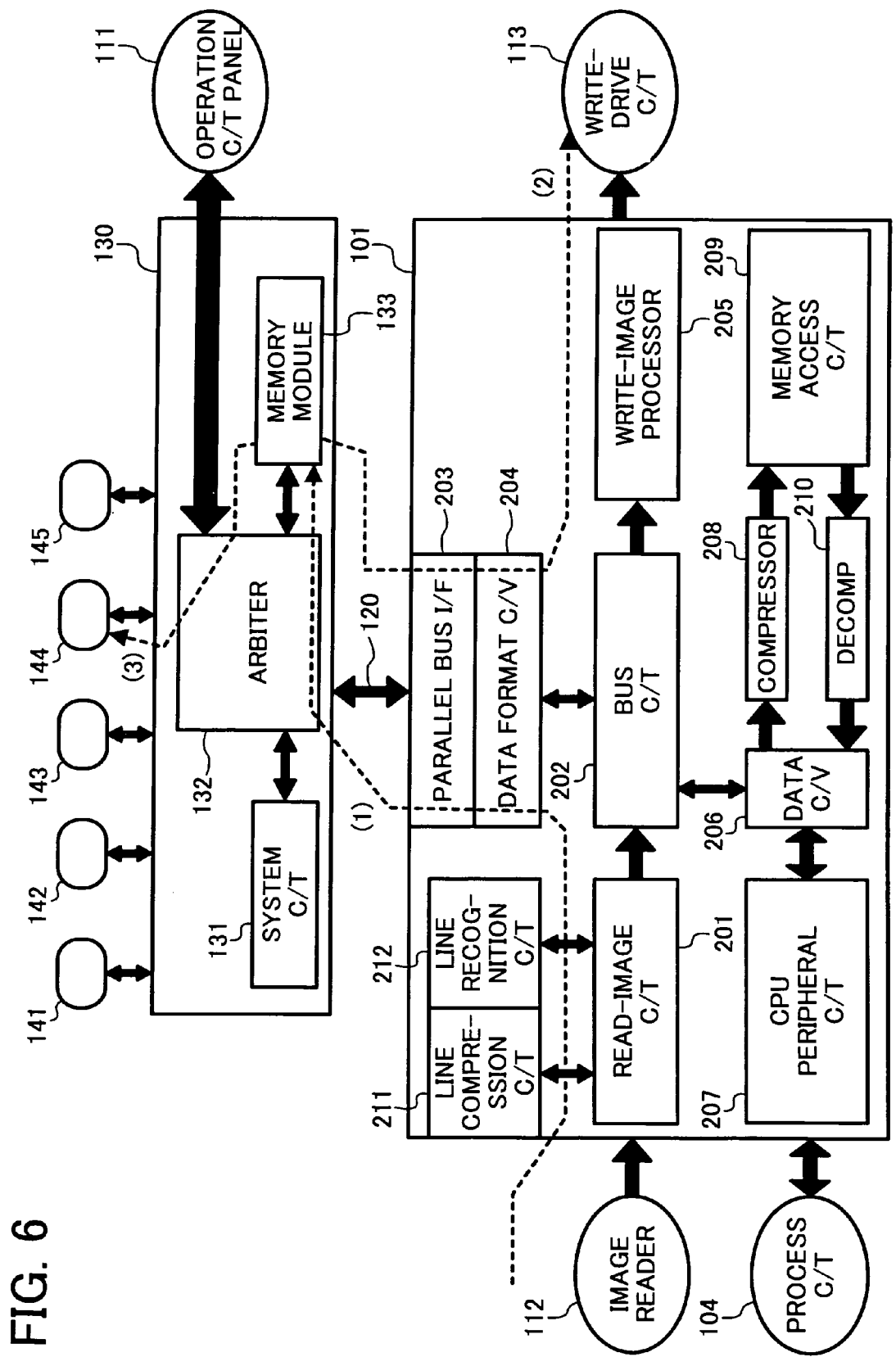
FIG. 6 is a diagram illustrating an operation of an image reproduction apparatus having multiple digital functions, for a case in which a process controller in an engine module is concerned with control of an operation control panel.

In the image reproduction apparatus configured as a digital multifunction device, the process controller 104 connected with the base engine/image data controller 101 may be concerned with the control of the operation of the operation control panel 111. In this case, the operation of the image reproduction apparatus is performed as described below with reference to FIG. 6. In FIG. 6, image data output from the image reader 112 is transferred along a path denoted by (1), and image data to be output is transferred along a path denoted by (2). The flow of data is controlled in a similar manner as with the apparatus shown in FIG. 5. In the data transfer along the path (1), the image data is stored into the shared memory module 133 on the controller board 130. In the data transfer along the path (2), the image data is read out from the memory module 133 on the controller board 130. The operation control panel 111 is attached, as a shared resource of the image reproduction apparatus, to the controller board 130, and a command output from the operation control panel 111 is transferred via the arbiter 132 under the control of the process controller 104 connected to the base engine/image data controller 101. As described above, the capability of the operation control panel 111 is extended depending on the extended functions of the image reproduction apparatus, and use of the operation control panel 111 by various applications is controlled by the system controller 131, which is responsible for control of the system. However, the displaying of data on the display of the operation control panel 111 is controlled by the process controller 104.

In FIG. 6, path (3) denotes a data flow in a particular application (for example, a color scanner application). Line-sequential data output from the image reader 112 of the color CIS type is received along the path (1) described above, and each color line data, including address data described in a header, is stored in the memory module 133 such that the image data is stored therein in units of color plane data. When the image data is read from the memory module 133 along the path (3), the data is output in units of color planes of red, green, and blue.

A command data output from the operation control panel 111 is input to the arbiter 132, and output over the parallel bus 120 via modules in the arbiter 132, such as the local bus controller 306, the system I/F 301, the access controller 308, and the parallel bus controller 302. Data to be displayed is acquired via the parallel bus 120. The parallel bus 120 is connected with the base engine/image data controller 101. The data input to the base engine/image data controller 101 via the parallel bus 120 is received by the parallel bus I/F 203 in the video controller 107. The command data originating in the operation control panel 111 is transferred to the data format converter 204 via the parallel bus I/F 203 under the control of the bus controller 202. In this case, the data is not image data to be copied, and the data format converter 204 transfers the received data to the CPU periphery controller 207. The CPU periphery controller 207 communicates with the process controller 104 and controls displaying of data on the display of the operation control panel 111 and analyzes a command input via the operation control panel 111.

In a case in which operations occur simultaneously in many optional functions, a large operation load is imposed on the system controller 131, which can cause a reduction in speed at which data is displayed. To avoid the above problem, the process controller 104, having enough performance to perform an addition operation in addition to process control, controls the displaying operation of the operation control panel 111. In this configuration of the image reproduction apparatus, the process controller 104 is concerned with the control of the operation control panel 111, and the resources of the base engine/image data controller 101 are used, regardless of whether the operation control panel 111 is configured differently depending on the whether the image reproduction apparatus is in the basic configuration or the extended configuration.

Figure 7A:
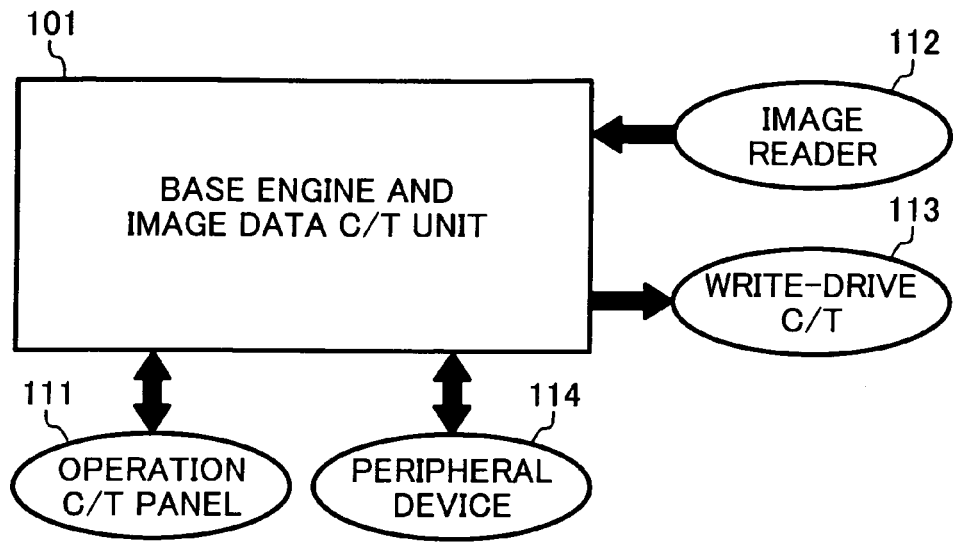
FIGS. 7A to 7C are diagrams showing examples of extended functions of an image reproduction apparatus.
Figure 7B:
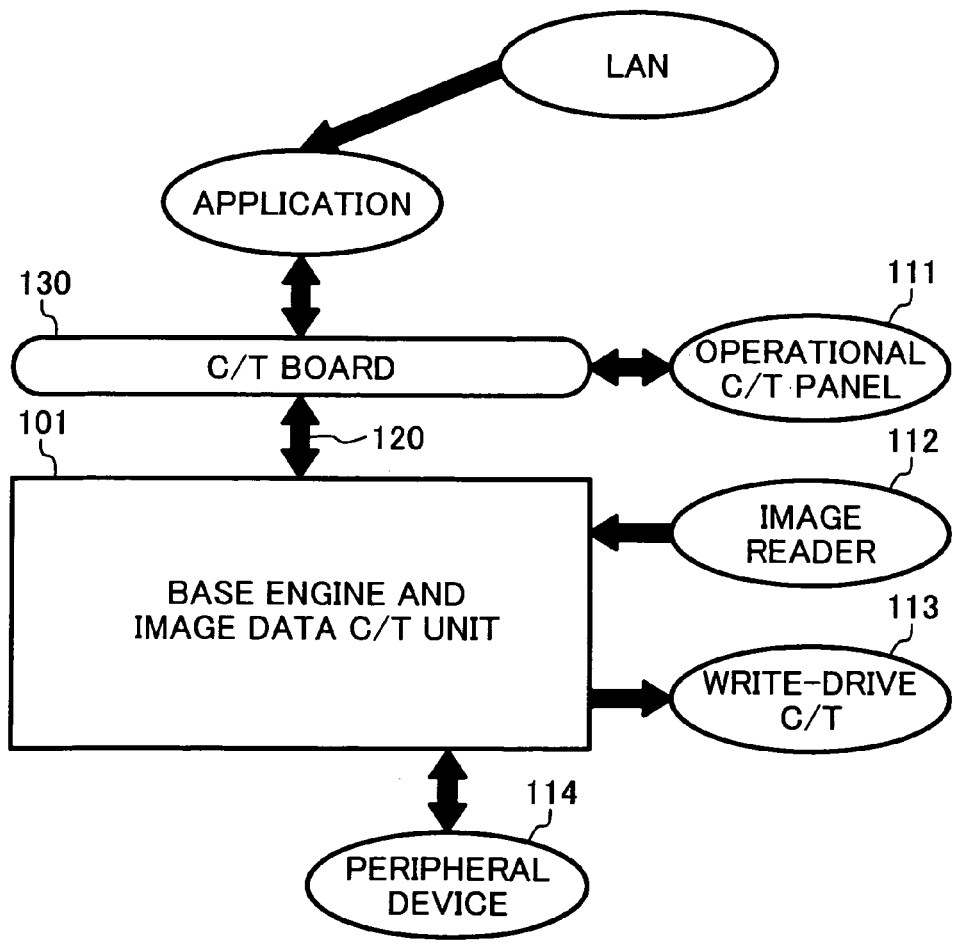
Figure 7C:
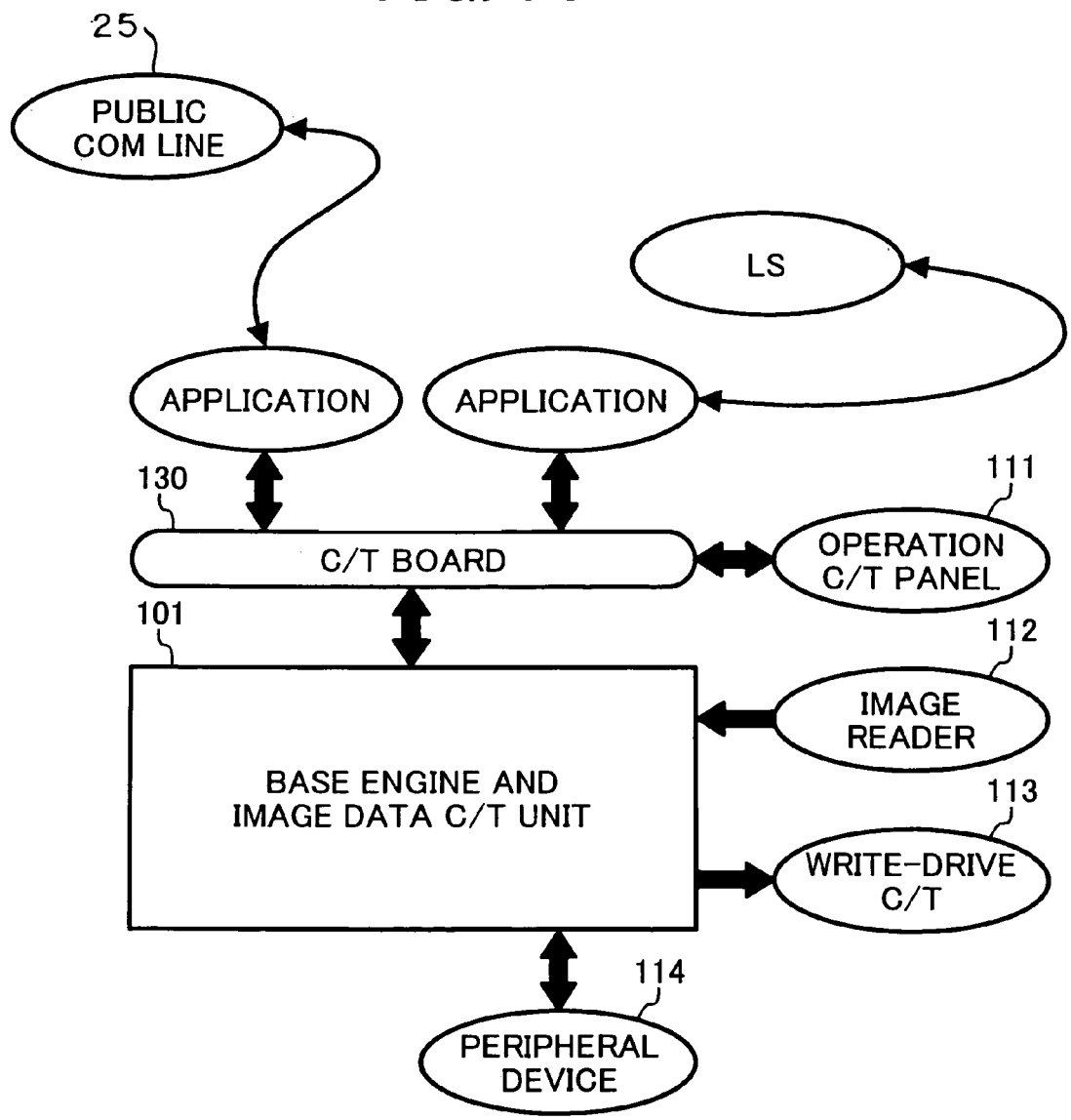

FIGS. 7A to 7C show examples of extended functions of the image reproduction apparatus, wherein FIG. 7A shows a configuration having only the basic function, FIG. 7B shows a configuration in which an additional function is added to the basic function, and FIG. 7C shows a configuration in which a plurality of functions are added to the basic function.

In the example shown in FIG. 7A, the configuration includes the base engine/image data controller 101, but the controller board 130 is not connected. In this configuration, the basic function, that is, the copying function is realized by using the resources provided by the base engine/image data controller 101. In this configuration, the image reader 112, the write drive controller 113, the operation control panel 111, and the paper input/output device 114 are connected to the base engine/image data controller 101, and the engine resources are all used for the copying function in which inputting of operation control commands, reading of an image, reproducing of the image on paper, and control of paper feeding are controlled by the process controller 104.

In the example shown in FIG. 7B, an application is added to the copying function. In this configuration, the controller board 130 is connected to the base engine/image data controller 101, and the additional application is implemented as an add-on function on the controller board 130. In this case, the controller board 130 serves as the mother board of the image reproduction apparatus, and the controller board 130 is responsible for general control over the entire image reproduction apparatus. The copy engine of the base engine/image data controller 101 is one of applications of the image reproduction apparatus. When the engine is viewed from the controller board 130, the engine is one of the shared resources of the image reproduction apparatus.

For example, in a case in which a LAN connection capability is added as an additional application, resources are properly assigned by the system controller 131 to realize capabilities such as a capability of transmitting image data captured by reading a document image over the LAN, and a capability of reproducing an image on paper in accordance with data received via the LAN in addition to the copying function. When seen from the controller board 130, both the network application and the copy application are equal in priority, and there is no difference in priority of use of resources between the applications. The order in which applications are connected does not cause a difference in priority. The resources are assigned in an optimal fashion depending on the status of applications connected at a particular time.

In the configuration shown in FIG. 7C, a plurality of applications are added to the controller board 130 serving as the mother board. In this specific example, a facsimile function using a public communication line 25 and a large-capacity image storage function (LS) are added. In this configuration, the order in which applications are added or the manner in which functions are combined causes no difference in priority among the functions. When seen from the controller board 130, the facsimile function using the public communication line 25 and the large-capacity image storage function are equal in priority.

The memory module 133 on the controller board 130 is used as a work area to temporarily store data. On the other hand, the image storage function is used to store image data and/or backup data for a long period. For example, images transmitted by facsimile, images received by facsimile, and/or copied images are stored in the form of digital data using the image storage function, such that any image can be retrieved and output when needed. When another network application is added, the stored images can be accessed on the network. As described above, a desirable function can be realized by properly combining resources.

Figure 8A:
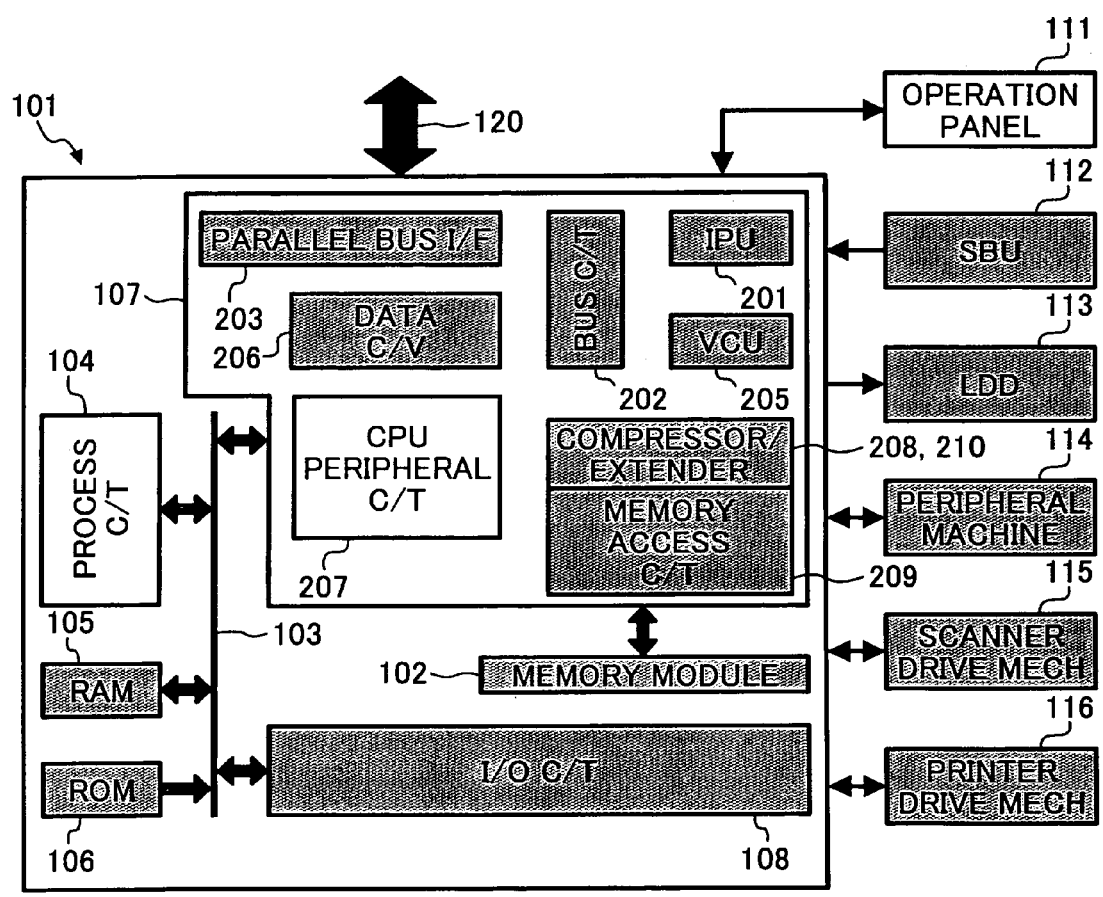
FIG. 8A is a diagram showing an image reproduction apparatus in a basic configuration.

When the image reproduction apparatus is in a waiting state, each unit thereof is brought into a particular state depending on the unit and depending on whether the image reproduction apparatus is configured to have only the basic function or configured to have extended functions, as described below. FIG. 8A is a diagram showing an image reproduction apparatus in the basic configuration, and FIG. 8B is a diagram showing an image reproduction apparatus in the extended configuration.

In the configuration shown in FIG. 8A, no interrupt from an external optional function occurs in a waiting state. However, when a user inputs a command via the operation control panel 111, the status changes into a normal operation mode. Therefore, in the waiting state, it is required that only the operation control panel 111, the process controller 104 monitoring the operation control panel 111, the CPU periphery controller 207 controlling the interfaces, and the CPU bus 103 be in operation, but the other units or modules do not need to be active. That is, it is not needed to supply electric power to functional units such as the image reader 112 and the write drive controller 113. The memory module 133 also does not need to be active, and thus no clock signal is supplied thereto and no electric power is supplied. Electric power is not supplied to any independent unit that does not need to be active, and no clock signal is supplied to modules in the video controller 107. In FIG. 8A, shaded modules are turned off during the waiting state, thereby minimizing the power consumption. If the video controller 107 is realized on a single chip, reduction in the number of components of the base engine/image data controller 101 is achieved, which results in a reduction in power consumption in operation.

Figure 8B:
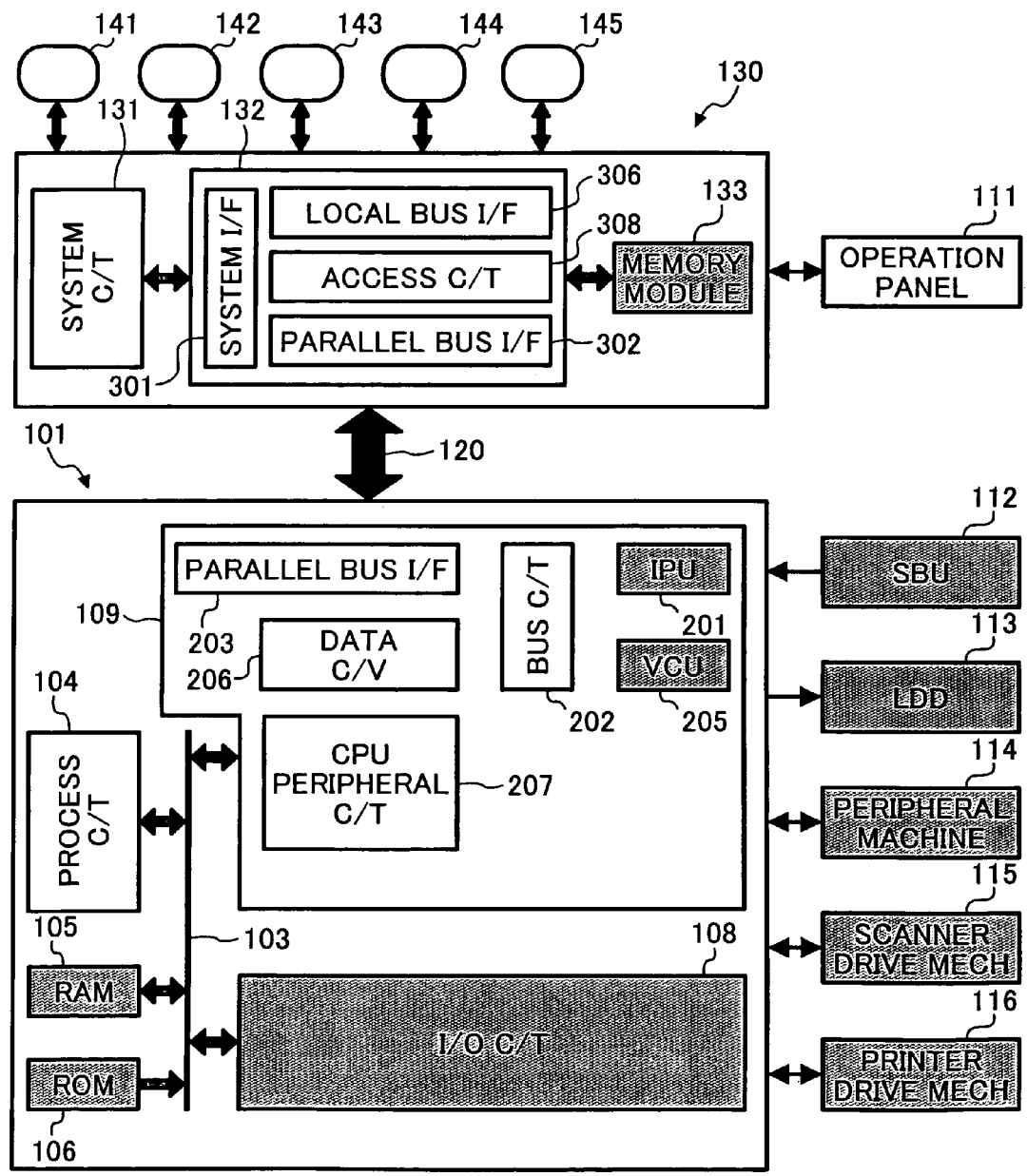
FIG. 8B is a diagram showing an image reproduction apparatus in an extended configuration.

In the configuration shown in FIG. 8B, a system start request is issued not only from the operation control panel 111, but also from external devices added to implement the additional functions. For example, a system start request is issued when facsimile data arrives or an image to be output is input via the LAN. However, if the system is kept active to wait for a system start request whose arrival cannot be predicted, electric power is consumed uselessly. To avoid the above problem, only parts necessary in receiving a system start request are kept active, and the other units and modules are inactivated. Thus, the memory module 133 on the controller board 130 is inactivated, and no clock is supplied to the memory access controller 304 in the arbiter 132. In FIG. 8B, shaded units or modules are inactivated during the waiting state.

In the video controller 107, the path via which information from the controller board 130 is transferred to the process controller 104 must be kept active, even in the waiting state. That is, the parallel bus I/F 203, the bus controller 202, the data format converter 204 (FIG. 2), and the CPU periphery controller 207 are kept active.

On the controller board 130, the system I/F 301 and the access controller 308 in the arbiter 132 are kept active to detect a system start request. The system controller 131 is also kept active to monitor the system. Of the applications connected to the controller board 130, applications connected to the outside are kept active. The image storage function is inactivated. Of units connected to the public line or the LAN, only units that are really necessary are kept active.

The memory module is exchangeable such that the memory module is disposed on the base engine/image data controller 101 in the basic configuration, but it is removed from the base engine/image data controller 101 and disposed on the controller board 130 in the extended configuration.

Figure 9A:
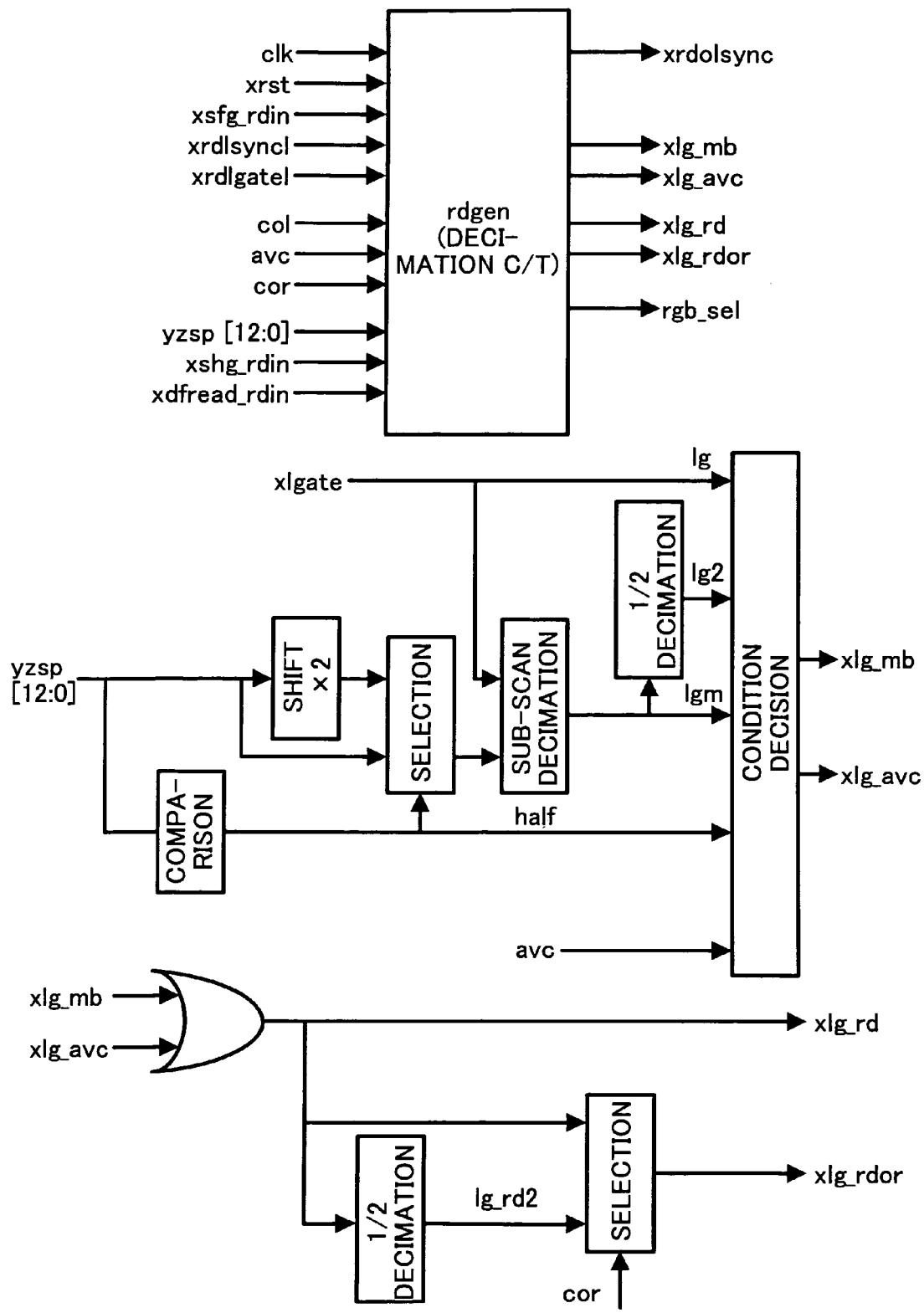
Figure 9C:
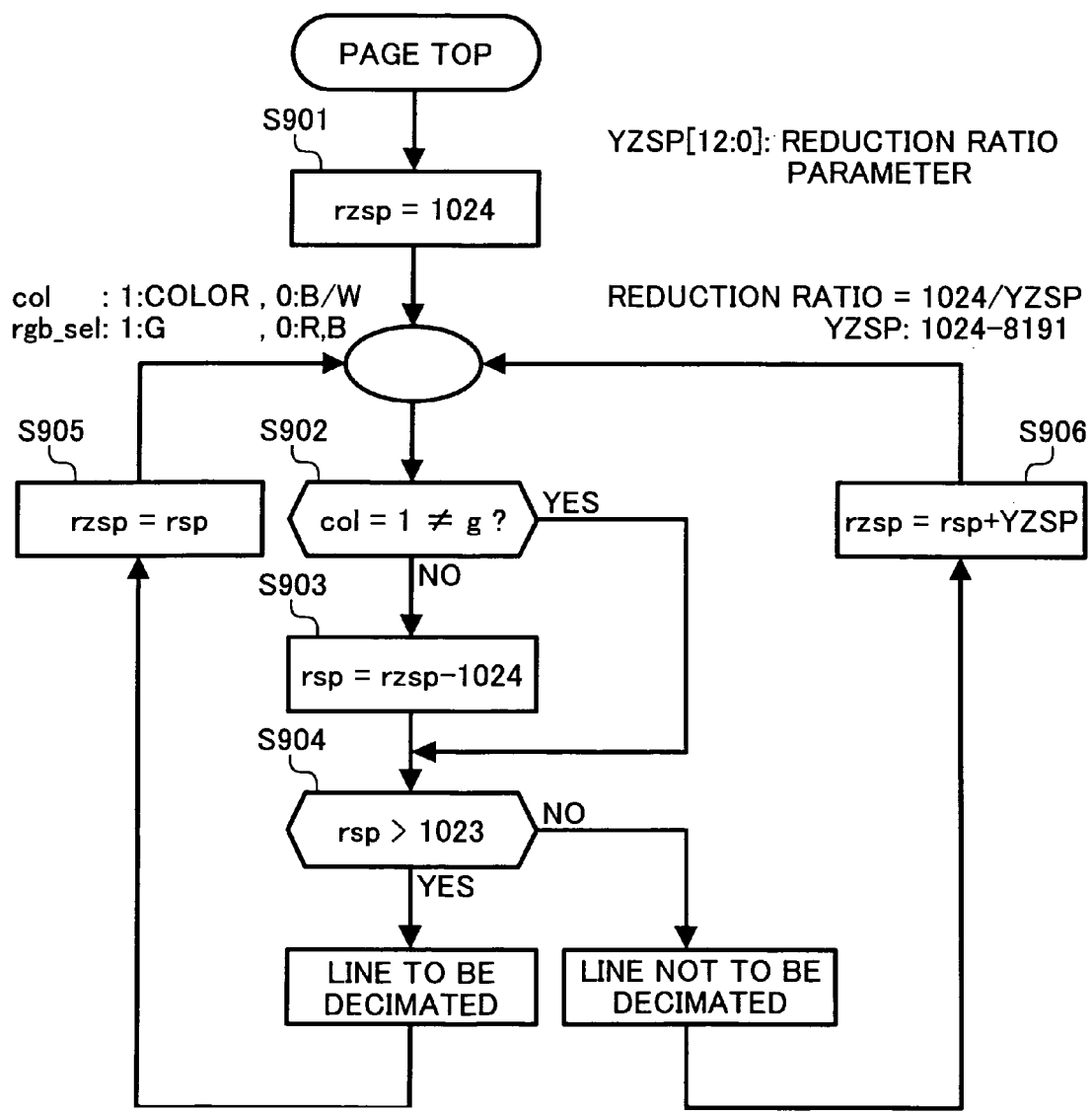

Now, line decimation in the sub scanning direction performed by the line decimation controller 211 is described. FIGS. 9A to 9C are diagrams illustrating line decimation in the sub scanning direction, wherein FIG. 9A shows structures of modules in the line decimation controller 211, FIG. 9B is a table showing signals generated in the respective modules, and FIG. 9C is a flow chart showing the procedure of line decimation in the sub scanning direction.

In the line decimation controller 211 including the modules shown in FIG. 9A, main-scanning line gate signals are decimated in an effective sub-scanning range such that the write enable signal is not supplied to the memory module 133 on the controller board 130, thereby disabling storing of data in the memory module 133, and thus decimating lines. The module rdgen generates a decimation control signal. Input signals applied to the module rdgen include control signals, such as a clock signal (clk), a reset signal (xrest), a monochrome/color identification signal (col), a control signal (avc) specifying whether to perform compensation for lost pixel information, a control signal (cor) specifying whether to perform a line OR operation in a binarization process, and a reduction ratio setting signal (yzsp) specifying the decimation ratio in the sub scanning direction, control signals specifying the operation range in the sub scanning direction including a signal specifying an effective image range in the sub scanning direction (xsfg_rdin), a signal specifying a range in which to read a shading white plate (xshg_rdin), and a signal specifying a range in which to read a background plate in reading a sheet-through document feeder (xdfread_rdin), and control signals specifying an operation range in the main scanning direction including a main-scanning line synchronization signal (xrdlsyncl) and a signal specifying an effective image range in the main scanning direction (xrdlgatel).

Figure 12A:
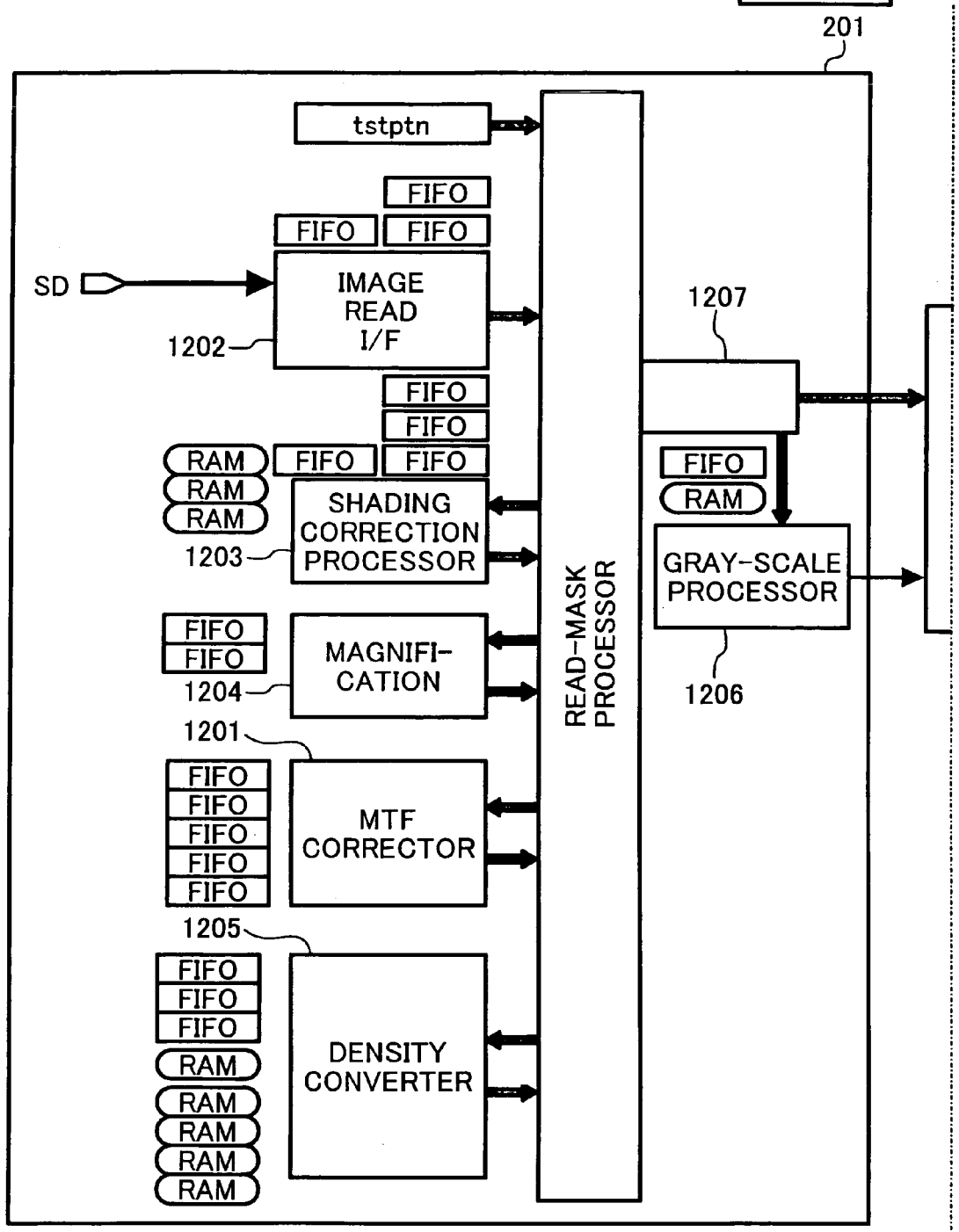
FIGS. 12A and 12B illustrate a block diagram showing the detailed structure of a read image processor.

Signals output from the module rdgen include main scanning line synchronization signal (xrdolsyn) for controlling processing, control signals (xlg_mb, xlb_avc, xlg_rd, and xlg_rdor) supplied to the modules of the respective functions to specify the effective image range in the main scanning direction, and a signal (rgb_sel) identifying a color channel. The level of the signal rgb_sel is controlled differently depending on whether the image data to be processed is color data or monochrome data. When the image data is color data, the signal rgb_sel is asserted only for a green signal. The level of this signal rgb_sel changes depending on the color channel, only when the respective control signals specifying the operation range in the sub scanning direction are asserted (low in level), but, when the controls signals are negated (high in level), the signal level changes in the same manner as in the monochrome mode. The signal xrdlgatel specifying the effective image range in the main scanning direction is supplied to the respective functional modules in the read image processor 201 (FIG. 12A).

xlg_mb and xlg_avc are supplied to the MTF corrector in the read image processor 201 to controls line decimation for multilevel image data. xlg_mb is a line control signal used in simple decimation, and xlg_avc is a line control signal used in multiple OR decimation (average processing or comparison processing is selected) in which compensation for lost pixel information is performed. xlg_rd is supplied to the density converter in the read image processor 201. xlg_rd has a level determined by the OR of xlg_mb and xlg_avc and is reflected in the result of line decimation in the MTF correction process. This signal is one of main scanning line control signals for multilevel image data. xlg_rd and xlg_rdor are supplied to the grayscale expression converter in the read image processor 201. xlg_rd is a line control signal for a multilevel signal, and xlg_rdor is a control signal for controlling line decimation for a binarized image signal.

As shown in FIG. 9B, yzsp is set to specify the reduction ratio S (%) in the sub scanning direction. In accordance with an input command avc, the decimation mode is set to the simple decimation mode or the average/comparison decimation mode. When the reduction ratio S is less than 50%, a mixed decimation mode of the simple decimation and the average/comparison decimation is employed to compensate for lost pixel information. When avc =0 and simple decimation is performed, lgm, determined so as to perform S % line decimation, is substituted into xlg_mb. lgm is also substituted into xlg_avc, and average/comparison decimation is not performed. When avc =1 and average/comparison decimation is performed, xlgate is directly substituted as lg into xlg_mb. In the average/comparison decimation, lgm, determined so as to perform S % line decimation, is substituted into xlg_avc.

In the line decimation, decimation is basically performed in a particular order. That is, simple decimation is first performed for multilevel data, and then average/comparison decimation is performed for the remaining lines. When a binary line OR operation is further performed, 50% line decimation is performed for the result of decimation on the multilevel data. In a case in which multilevel data is decimated with the reduction ratio less than 50% in the simple-average/comparison mixed mode, 2S % simple decimation is first performed, and then 50% line decimation is performed for the remaining lines. In this case, lgm, controlled so as to achieve 2S % decimation, is substituted into xlg_mb, and lg2, controlled so as to achieve 50% of lgm, is substituted into xlg_avc. When yzsp specifies a reduction ratio less than 50%, a half flag is set, and the value of yzsp is multiplied by 2, thereby changing the decimation ratio to 2S %.

In the binary OR operation, exudation between two adjacent lines is performed to compensate for lost pixel information. This process is performed by performing OR operation on binary signals, and the process results in 50% decimation. When this process is performed, ½ decimation is performed on the main scanning line signal. The result of multilevel decimation is reflected in xlg_rd. That is, xlg_rd is a line control signal based on the result of the simple decimation and the average/comparison decimation. More specifically, xlg_rd or ½-decimated xlg_rd is selected and supplied as xlg_rdor to control the binary processing. The selection is controlled by the selection flag cor. More specifically, when cor =1, the binary line OR operation is performed, but the binary line OR operation is not performed when cor =0.

Referring to the flow chart shown in FIG. 9C, the line decimation procedure is described in further detail below. Herein, by way of example, the reduction ratio is 12.5% to 100% and the resolution accuracy is 0.1%. YZSP[12:0] specify the reduction ratio range, and rzsp specifies the resolution. In the present example, the control for the color CIS is also discussed, wherein the detailed description of the line-sequential color discrimination for the color CIS is given later. When image data to be processed is color data, decimation is performed on the basis of green signals.

First, at the beginning of a page, decimation conditions are determined. That is, first, rzsp is set to 1024 (step S901). Thereafter, it is determined whether col =1 and the color is green (step S902). Note that col =1 when the signal is a color signal but col =0 when the signal is a monochrome signal. If it is determined that col =1 and the signal is a green signal (that is, if the answer to step S902 is yes), the process proceeds to step S904, but otherwise (if the answer in step S902 is no) the process proceeds to step S903. If it is not determined in step S902 that col =1 and the color is not green, the value of rsp is calculated (rsp =rzsp −1024) (step S903).

Subsequently, it is determined whether the current line is a line to be discarded, on the basis of the value of the rsp signal (step S904). In this specific case, the determination whether the current line is a line to be discarded is made by judging whether rsp>1023. That is, if rsp >1023 (that is, if the answer in step S904 is yes), then the current line is determined as a line to be discarded, and the process proceeds to step S905. However, if rsp is not greater than 1023 (that is, if the answer in step S904 is no), the current line is determined not to be a line to be discarded, and the process proceeds to step S906. In the case in which it is determined in step S904 that the current line is a line to be discarded, rzsp is reset to rzsp=rsp (step S905), and the process returns to step S902. On the other hand, in the case in which it is determined in step S904 that the current line is determined not to be a line to be discarded, rzsp is reset to rzsp=rsp+YZSP (step S906), and then the process returns to step S902.

When the given signal is a monochrome signal, decimation is performed as follows. In a case in which the image is to be reduced to ⅓, two lines are discarded every three lines. In this case, YZSP is set to 3072 (=1024×3). First, in step S901, rzsp is set to 1024. In step S902, it is determined, in this specific case, that col =0 and thus the process proceeds to step S903. In step S903, the value of the rsp signal is calculated. In this specific example, rsp =rzsp −1024=1024−1024=0. Thus, rsp<1023, and it is determined in step S904 that the first line is a line not to be discarded. In step S906, rzsp is set as rzsp=rsp+YZSP=0+3072 =3072. The process then returns to step S902 to make a second time determination.

In this specific case, it is determined that col =0 in the second time determination (step S902). In the next step S903, rsp is calculated as rsp =rzsp−1024=3072−1024=2048. Thus rsp>1023 and it is determined that the current line is a line to be discarded (step S904). In the next step (step S905), rzsp is reset to rzsp=rsp =2048. Thereafter, a third time determination is performed.

In the third time determination, it is determined that col =0 (step S902). In the next step S903, rsp is calculated as rsp =rzsp−1024=2048−1024=1024. Thus rsp>1023 and it is determined that the line is a line to be discarded (step S904). In the next step (step S905), rzsp is reset to rzsp=rsp =1024. Thereafter, a fourth time determination is performed.

In the fourth time determination, it is determined that col =0 (step S902). In the next step S903, rsp is calculated as rsp =rzsp−1024=1024−1024=0. Thus, rsp<1023 and it is determined that the line is a line not to be discarded (step S904). As described above, two of every three lines are discarded thereby achieving an image reduction in the sub scanning direction.

When the color CIS is used, line-sequential control is performed as follows. FIGS. 10A to 10D are diagrams illustrating the line-sequential control of the color CIS. In the line-sequential control for the color CIS, the signal rgb_sel is generated and sub scanning is started (xfgate is asserted) from a green line in response to xfgc indicating a start of a sub scanning frame signal. More specifically, the control module grbcntl generates a signal rgb_sel indicating a RGB channel for each line, in accordance with the input clock signal (clk), the reset signal (xrst), the monochrome/color identification signal (col), a line synchronization signal xlsync, a signal specifying an effective image range in the sub scanning direction xsfgate, and a signal specifying a sub-scanning range in which to read the white plate.

In the case in which the color CIS is used, the flag col is set, and image data is read in the order G, B, and R. The signal rgb_sel is set to 1 for any G (green) line, but rgb_sel is set to 0 for B (blue) and R (red) lines. Note that when col =0 (monochrome image), rgb_sel is always set to 1, and decimation is performed without concern for the color of lines. In order to correctly start the line-sequential control of the image, the CIS is turned on one line earlier than the start of the line-sequential control. On the assumption that scanning is started from a green line, a red lamp is turned on. In the monochrome mode (col =0), as shown in FIG. 10A, rgb_sel is maintained at 1, and all lines are subjected to determination as to whether to discard the line. As described above, the determination as to whether to discard a line is performed when col =1 (FIG. 9C). In the case of the color CIS, this determination is performed when the current line is green, and the result of the determination is directly reflected in immediately following red and blue lines. However, in the color mode, the signal rgb_sel is generated within the specified effective image range in the sub scanning direction. In any interval other than intervals in which to read the image or the white plate, the signal rgb_sel is set to 1 as in the monochrome mode.

Figure 10B:
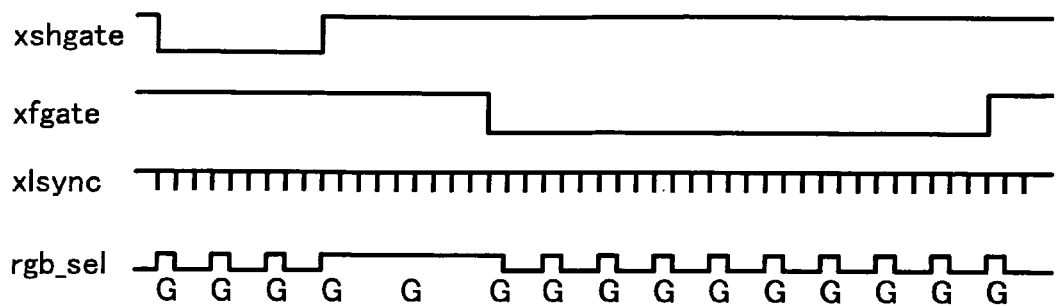

FIG. 10B shows timings of generating the signal rgb_sel. As shown in FIG. 10B, the signal rgb_sel identifying the channel is generated when xshgate and xsfgate are at the low level. However, the signal rgb_sel is negated and maintained at the same level as the level for the green lines, or as the level in the monochrome mode. In the case of the color CIS, three line synchronization signals xlsync for R, G, and B lines are necessary for each physical one line of a document. The period after the completion of reading the white plate, and before the start of reading the document is not managed on the basis of an integral multiple of three lines, and this period affects the machine throughput. In this period, the apparatus is set in the monochrome mode and waits for the start of reading a document such that the apparatus can correctly start reading the document without any delay (even one line delay), and without missing even one line regardless of the manner in which the reading of the document is started.

Figure 10C:
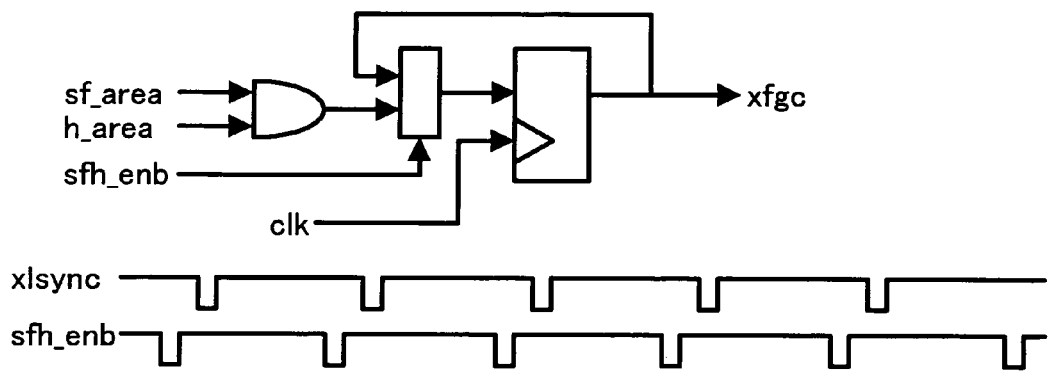
Figure 10D:
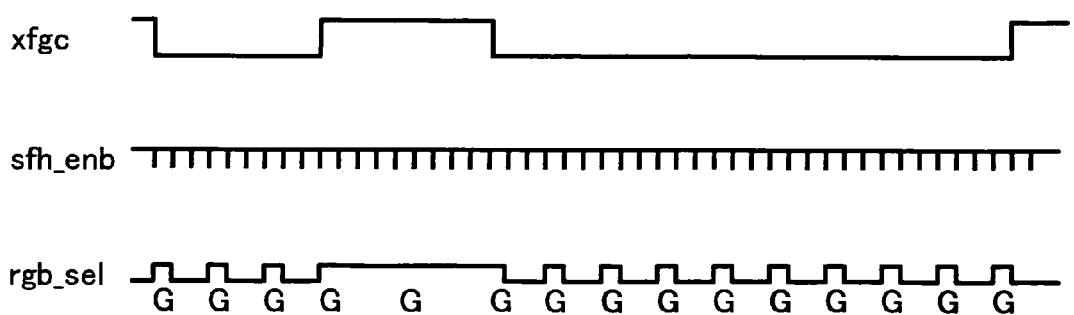

However, as can be seen from FIG. 10B, the module (the image reader I/F 1202 shown in FIG. 12) that controls turning-on/off of the CIS lamp cannot correctly determines in what state the signal rgb_sel=1 is generated. That is, it is impossible to determine whether rgb_set=1 is a valid asserted signal indicating that the color CIS lamp should be turned on or a signal output in the waiting state in an interval other than the reading range. To avoid the above problem, a sub-scanning arbitration signal xfgc is generated at a time earlier than the reading line synchronization signal, and is supplied to the color CIS, thereby making it possible for the color CIS to correctly determine the state in which the signal rgb_set is generated. That is, as shown in FIG. 10C, a line control signal sfh_enb, which changes earlier than the line synchronization signal xlsync, is generated to indicate that transition to a new line will occur soon. The logical AND of the trigger signal sf_area in the sub-scanning reading area occurs before synchronization with xlsync and the trigger signal h_area in the white plate reading area. The resultant AND signal is output in synchronization with sfh_enb to indicate, at a timing earlier than xlsync, whether each line is within the effective image data range in the sub scanning direction. FIG. 10D shows the relationship among xfgc, the line period, and rgb_sel. Thus, before rgb_sel is given, xfgc indicating the state of each line is given.

Figure 11A:
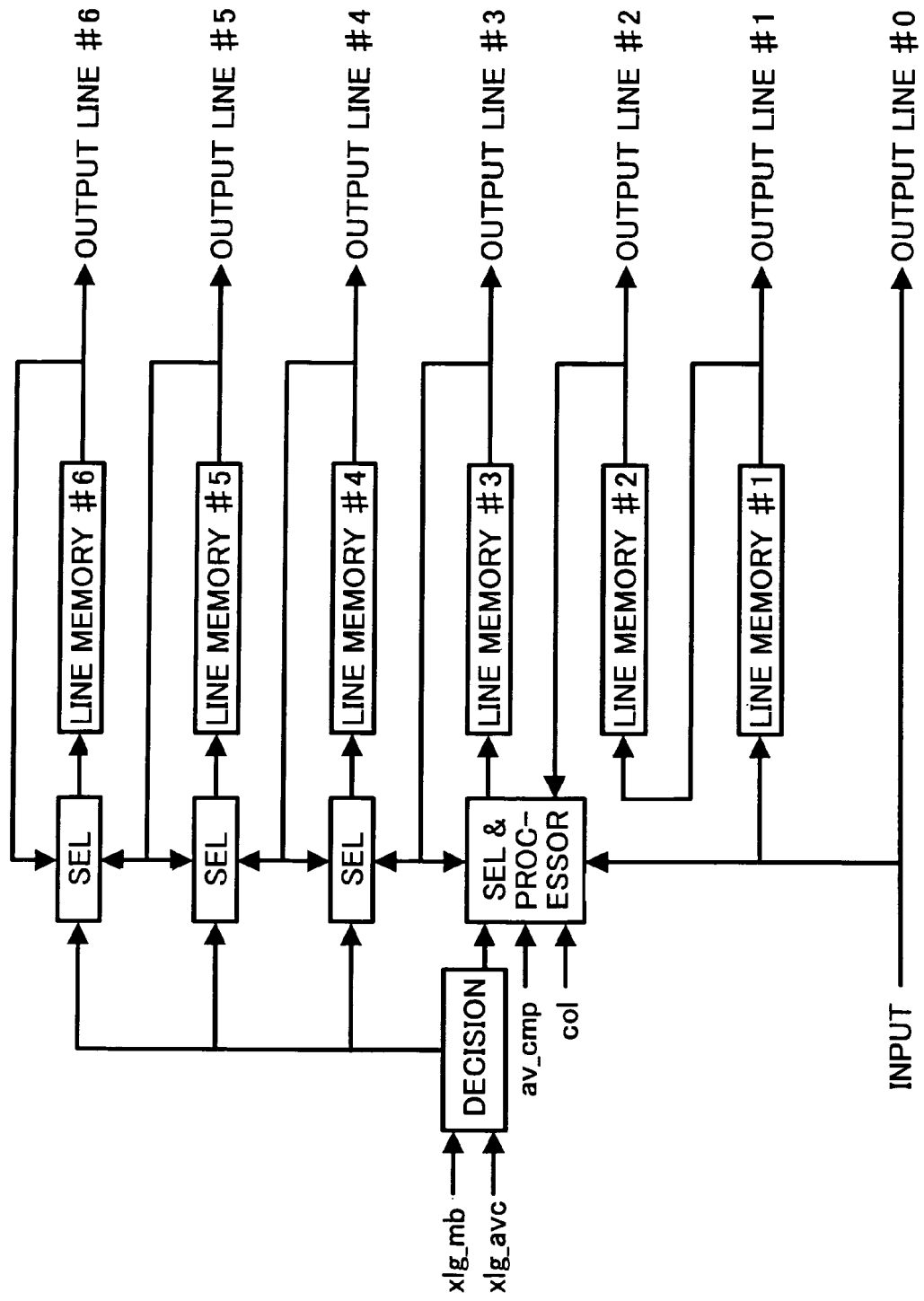
FIGS. 11A to 11C are diagrams illustrating a manner in which a line memory set is controlled.
Figure 11B:
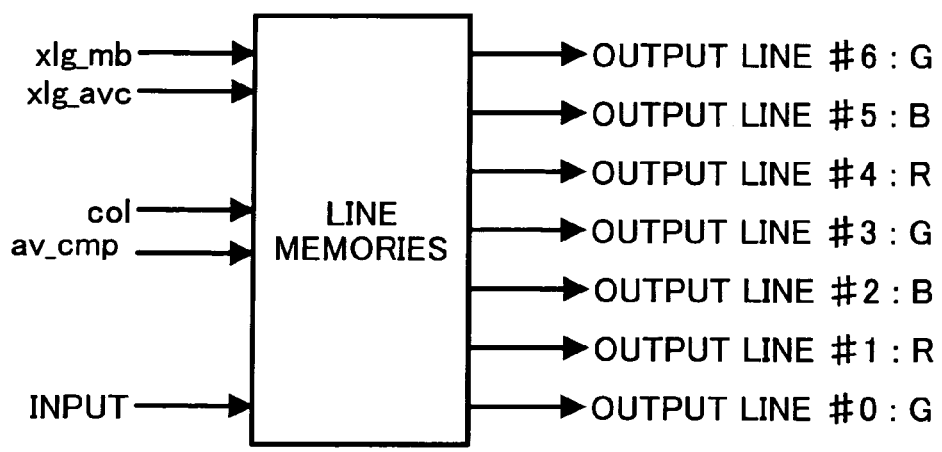
Figure 11C:
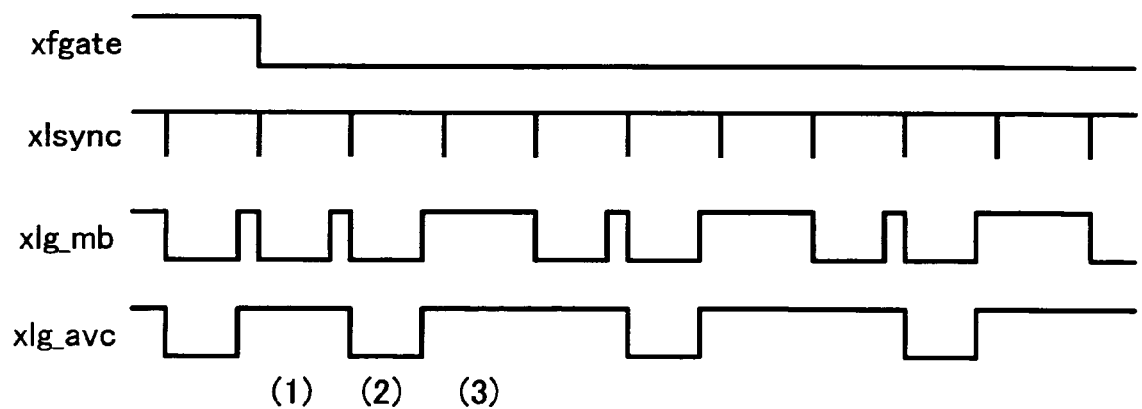

The operation of a line memory set (FIFO memory set) in the line decimation controller 211 will now be described. FIGS. 11A to 11C are diagrams illustrating a manner in which the line memory set is controlled. FIG. 11A shows the configuration of the line memory set. In FIG. 11A, when one line of image data is input to the line memory set, a line memory #1 stores the one line of image data and outputs it after a one-line delay, a line memory #2 outputs the one line of image data after a two-line delay, and a line memory #3 outputs the one line of image data after a three-line delay. The line memory #3 forms a central line of an image generation matrix, and interline compensation for lost pixel information is performed on this central line. When decimation is performed on the line memory #3, the data stored in each of the line memories #4, #5, and #6 is retained.

In a case in which data is processed in the monochrome mode without decimation, that is, with no reduction, each line data is simply transferred from one line memory to another. In this state, main scanning line control signals xlg_mb and xlg_avc are both asserted, and no decimation is performed. In the case of simple monochrome decimation, xlg_mb is omitted every few lines. xlg_avc is also omitted with the same timing, and thus the decimation control module controls the decimation in accordance with xlg_mb.

In the input line and the line memories #1 and #2, a one-line delay is created regardless of the status of xlg_mb. However, the signal transfer between the line memory #2 and the line memory #3 is performed differently depending on whether decimation is performed or not. More specifically, when the current line is to be preserved, the data output from the line memory #2 is directly input to the line memory #3. However, when the current line is a line to be discarded for decimation, the data stored in the line memory #3 is needed to be retained. Thus, the data output from the line memory #3 is fed back to the line memory #3 and stored therein again. The data in the line memory #2 is deleted and thus, one line of image data is discarded from the image data. In this decimating period, line data stored in each of the line memories #4, #5, and #6 is retained. That is, transferring of data is not performed such that the data output from the line memory #3 is input to the line memory #4, the data output from the line memory #4 is input to the line memory #5, and the data output from the line memory #5 to the line memory #6, but transferring of data is controlled by the selection circuit such that the data output from the line memory #4 is fed back to the line memory #4, the data output from the line memory #5 is fed back to the line memory #5, and the data output from the line memory #6 is fed back to the line memory #6. In the operation of the line memory set as a whole, the data stored in the line memory #2 is discarded, and the data stored in the line memories #3 to #6 are retained.

In the case in which monochrome image data is decimated in the average/comparison mode, decimation is controlled in accordance with xlg_avc when xlg_mb is in a particular state. In the case in which decimation is performed only in the average/comparison mode, decimation is performed when xlg_mb is asserted. When xlg_mb is asserted, if xlg_avc is also asserted, the current line is discarded. The decimation mode is switched between the average decimation mode and the comparison decimation mode in accordance with ac_cmp. When ac_cmp =0, the average of the current line and the previous line is employed. When ac_cmp =1, the current line is compared with the previous line, and a greater value is employed. The result is stored in each line memory.

In the input line and the line memories #1 and #2, the data is delayed regardless of the states of xlg_mb and xlg_avc. However, the signal transfer from the line memory #2 to the line memory #3 is performed differently depending on the control signals. That is, when xlg_mb is asserted and xlg_avc is negated, the data output from the line memory #2 is input to the line memory #3. In this case, data input to each of the line memories #4 to #6 is given by data output from the previous line memory. When xlg_mb and xlg_avc are both asserted, the line is discarded. That is, the result of average/comparison operation on data output from the line memory #3 and data output from line memory #2 is input to the line memory #3. More specifically, when ac_cmp =0, the result of the average operation is input, but the result of the comparison operation is input if ac_cmp =1. Thus, when one line of data is deleted from the data stored in the line memory set, the loss of information due to discarding of one line pixel information is compensated for by means of average/comparison operation. When the above-described decimation is performed, the data stored in each of the line memories #4 to #6 is retained by feeding the data output from each line memory back to the same line memory.

In the monochrome mode, when decimation is performed in the simple-average/comparison mixed mode, the line control is performed differently depending on xlg_mb and xlg_avc. FIG. 11C shows the timings of the line control. In the input line and the line memories #1 and #2, the data is delayed regardless of the states of xlg_mb and xlg_avc. However, the signal transfer from the line memory #2 to the line memory #3 is performed differently depending on the control signals. More specifically, when xlg_mb is asserted and xlg_avc is negated, the data output from the line memory #2 is input to the line memory #3. In this case, data input to each of the line memories #4 to #6 is given by data output from the previous line memory ((1) in FIG. 11C).

When xlg_mb and xlg_avc are both asserted, the line is discarded. That is, the result of average/comparison operation on data output from the line memory #3 and data output from line memory #2 is input to the line memory #3. More specifically, when ac_cmp =0, the result of the average operation is input, but the result of the comparison operation is input if ac_cmp =1. Thus, when one line of data is deleted from the data stored in the line memory set, the loss of information due to the discarding of one line pixel information is compensated for by means of average/comparison operation. When the above-described decimation is performed, the data stored in each of the line memories #4 to #6 is retained by feeding the data output from each line memory back to the same line memory. ((2) in FIG. 11C).

That is, when xlg_mb is asserted and xlg_avc is negated, the line of interest is completely discarded. In this case, the data output from the line memory #3 is simply fed back to the line memory #3. When the above-described decimation is performed, the data stored in each of the line memories #4 to #6 is retained by feeding the data output from each line memory back to the same line memory. ((3) in FIG. 11C). For the next line, transferring of data from one line memory to the line memory at the following stage, replacement of data with the result of average/comparison operation and retaining of data are performed depending on the states of xlg_mb and xlg_avc.

Decimation in the color mode is described below with reference to FIGS. 11A and 11B. The color signal is input line by line in the order of G, B, and R. In the monochrome mode described above, a seven-line image matrix is formed of one input line and six line memories. On the other hand, the image matrix used in the case of the color CIS MTF correction, includes green, blue, and red lines, and the MTF correction operation is performed on the three output lines #0, #3, and #6 when col =1. In the status shown in FIG. 11B, green signals appear in output lines #0, #3, and #6 and are subjected to processing for the MTF correction. In response to a next line synchronization signal, data is transferred from one line memory to the following line memory. As a result, blue signals appear in lines #0, #3, and #6.

The determination as to whether to discard a line is made when green signals appear in lines #0, #3, and #6, and the processing associated with the line discarding, the average/comparison operation, and the delay-and-store operation is performed in the same manner for R, G, and B channels in response to three line sync signals. In this case, unlike the monochrome mode, the average/comparison operation is performed not between immediately adjacent lines, but between the input line and the output line #3, because immediately adjacent lines are concerned with different colors.

Figure 12B:
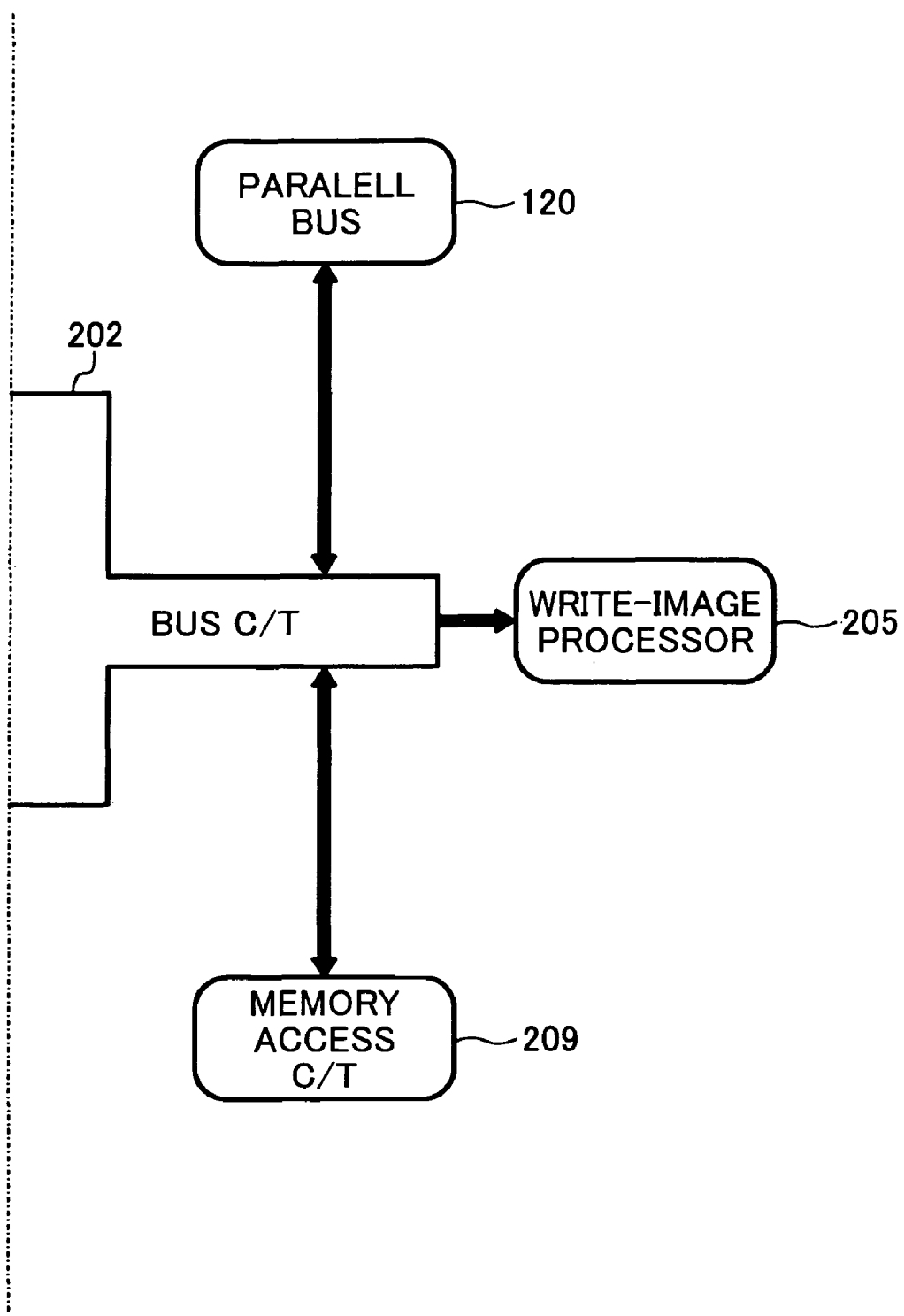

FIGS. 12A and 12B illustrate a block diagram showing the detailed structure of the read image processor 201 shown in FIG. 2. In the read image processor 201, a MTF corrector 1201 processes data received from the six line memories shown in FIG. 11. In this MTF corrector 1201, processing is performed using a seven-line image matrix formed of the six line memories and input data received from the previous stage. When line decimation is performed to reduce the image in the sub scanning direction, each line data is subjected to one of the following processing: discarding, simply feeding back to retain data, or replacing the data of current line with the result of the average operation or the comparison operation between the current line and the previous line, thereby minimizing the loss of information due to decimation.

In FIG. 12A, a signal SD output from the CCD or the color CIS is received by an image reader I/F 1202. The received signal is subjected to image processing in a shading corrector 1203, a scaling-up/down controller 1204, the MTF corrector 1201, a density converter 1205, and a grayscale expression converter 1206. In a masking unit 1207, masking is performed for input image data or image data to be output. The bus controller 202 controls the data flow of data transmitted over the parallel bus 120, data input/output to/from the write-image processor 205, and data input/output to/from the memory access controller 209.

In the color mode, the image reader I/F 1202 controls inputting of image data such that the image data is correctly input line by line, and the bus controller 202 controls transmission of data such that data is packed and the packed data is transmitted over the parallel bus 120. The control of decimation process is performed by sending main-scanning image control signals to the MTF corrector 1201, the density converter 1205, and the grayscale expression converter 1206. In FIG. 12A, RAMs and FIFO memories are disposed close to the respective modules. Note that the locations of those memories are drawn in the figure in a very simplified fashion.

Figures 13, 13A, 13B:
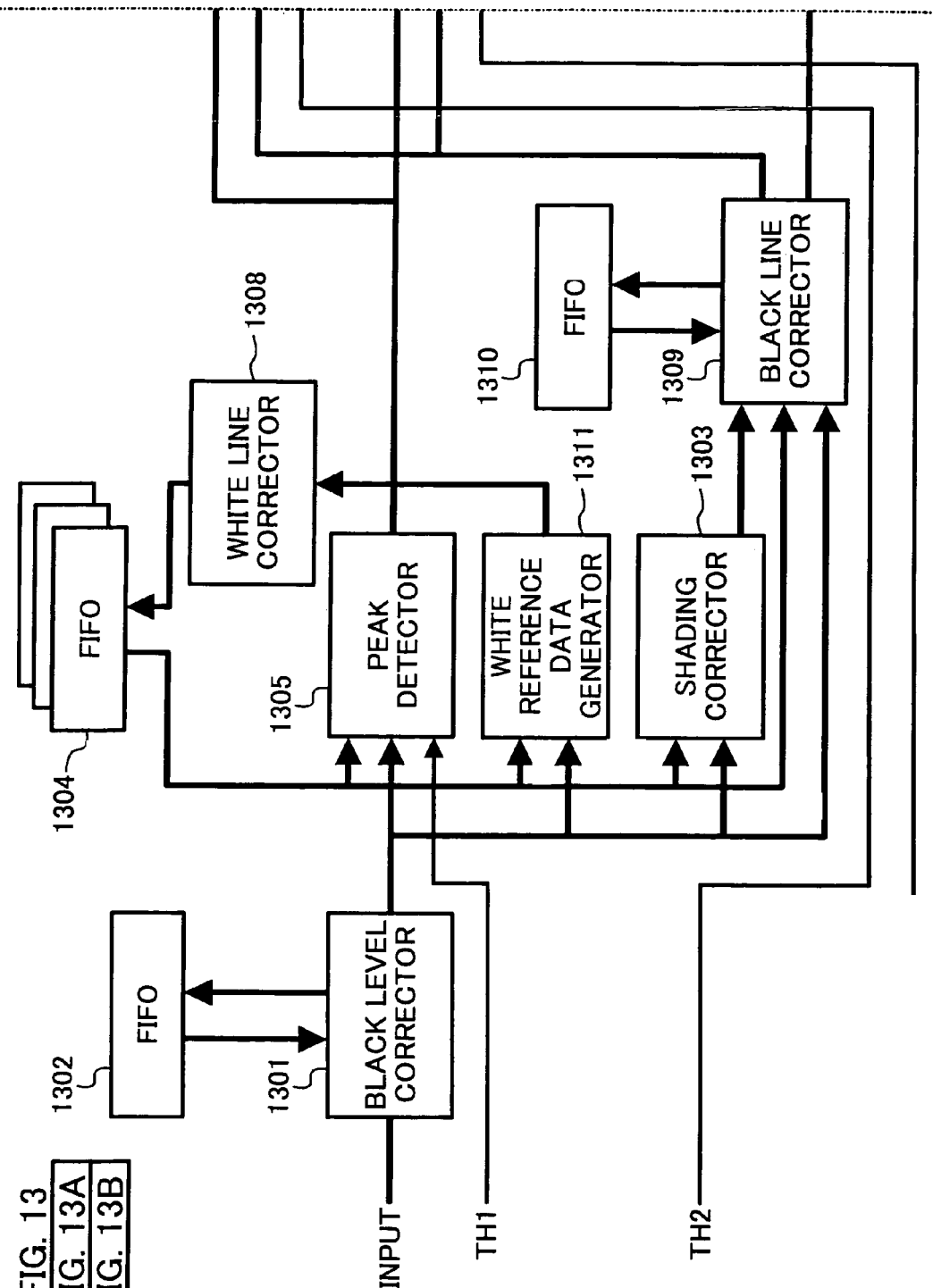
FIGS. 13A and 13B illustrate a block diagram showing a structure of a shading corrector.
Figure 13B:
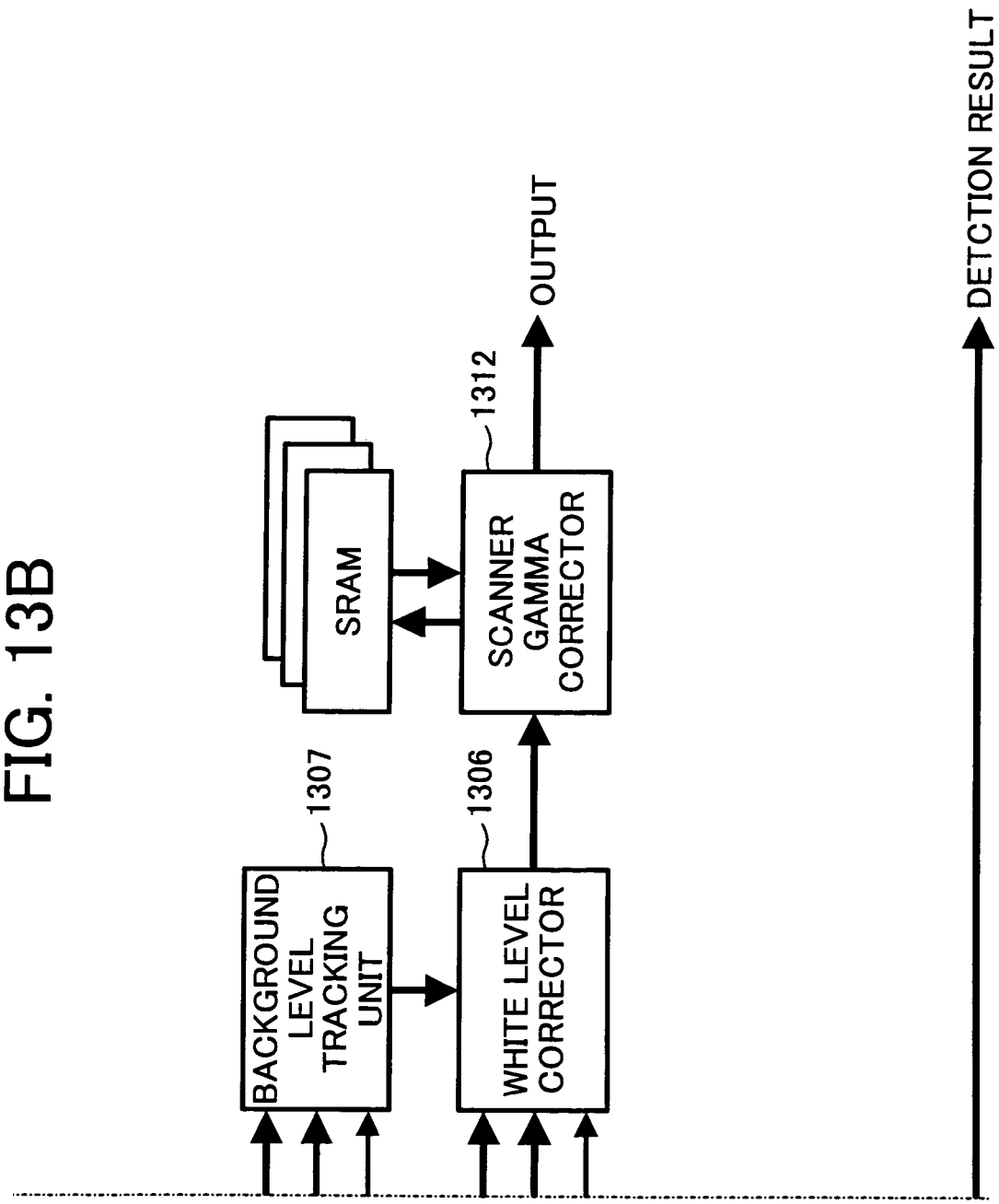

FIGS. 13A and 13B illustrate a block diagram showing a structure of the shading corrector 1203. In the image reproduction apparatus according to an embodiment of the present invention, information associated with the detection/correction of black streaks and detection of invalid pixels is stored in a memory, and the causes of black streaks are displayed or transmitted via the network. When a service person needs condition history information, information indicating the status of invalid pixels caused by paper dust or the like is printed out in response to a request issued by the service person. When the above-described condition information is printed, the information is converted into bitmap data on the memory in the controller or the engine, and printing on paper is performed in accordance with the bitmap data. The shading corrector 1203 includes the following units for performing shading correction and other corrections on input image data.

(1) Black level corrector 1301: Using the FIFO memory 1302, the black level of each pixel is sampled and subtracted from the input image data. The reference data indicating the black level to be subtracted from image data is obtained by reading in enable periods (several lines) without activating the light source, and performing multiple averaging. In the color mode, the same reference data is used in all colors.

(2) Shading corrector 1303: Using the FIFO memory 1304, the white level of each pixel is sampled and the white distortion is corrected. The white reference level is produced by means of multiple averaging. The peak level of the white reference data is used as the reference level in the correction processing. The correction processing is performed using a division table. In the case in which the color CIS is used, white waveform data is stored in different FIFO memories 1304 for each color R, G, and B. When image data is read, the white waveform data is switched depending on the color of the image data.

(3) Peak detector 1305: The peak value of the white level is detected and held. The white reference data (data stored in the FIFO memory) or data obtained by reading an image is specified as data from which to detect the peak level. The detected peak value is referred to when the reference value of the shading correction reference level and the reference value used by the white level corrector 1306 are calculated. The peak value is stored in a register and the peak value is read from the register when needed. Alternatively, an arbitrary value may be set as the peak value. A turn-on failure of the light source can be detected by comparing the peak value with a properly selected threshold. When a turn-on failure is detected, an interrupt signal is generated.

(4) White level corrector 1306: Image data obtained by reading a document is normalized to the reference white level or the document background level. The reference level used in operation is changed depending on the reading condition. In the case in which background subtraction is not performed, a greater peak level of the white reference data detected by the peak detector 1305 is used as the reference level. On the other hand, in the case in which background subtraction is performed, a predetermined table is referred to with respect to the background level detected in the background tracking operation.

(5) Background level tracking unit 1307: The document background level is detected, and the dynamic range is expanded depending on the optical image density of the document. More specifically, the input data is averaged in the main scanning direction thereby suppressing abrupt changes.

(6) White streak detector/corrector 1308: dust or stains on the reference white plate are detected, and dips in the white waveform that cause white streak images are corrected. More specifically, detection of dust or stains is performed on the data output from the white reference data generator 1311, and corrected data is stored in the FIFO memory 1304. Information indicating the number of detected invalid pixels and the detected maximum width is stored as detection information in a register, and the information is read from the register as required.

(7) Black streak detector/corrector 1309: When reading is performed using the sheet-through document feeder, dust or stains on the background plate are detected, and dips in the read data that cause black streak images are corrected. In the case of a sheet scanner in which white reference data for use in shading correction is generated from the background plate of the sheet-through document feeder, the detection is performed on the data read from the FIFO memory 1310. The detection result is represented by a 1-bit flag assigned to each pixel and stored in a dedicated FIFO memory 1310. When a document image is read, black streak correction for the document image data is performed using the correction data stored in the FIFO memory 1310. In the color mode, black streak detection is performed only for green lines, and correction is performed for all colors using the correction data obtained for green lines. The detection information stored in the register includes the number of detected pixels and the detected maximum streak width.

(8) Scanner gamma corrector 1312: The gamma characteristics of the scanner is corrected. The correction is accomplished by performing white-black logical conversion in the input stage. In the color mode, the gamma correction is performed separately for each of R, G, B colors, using different corresponding correction tables.

Figure 14:
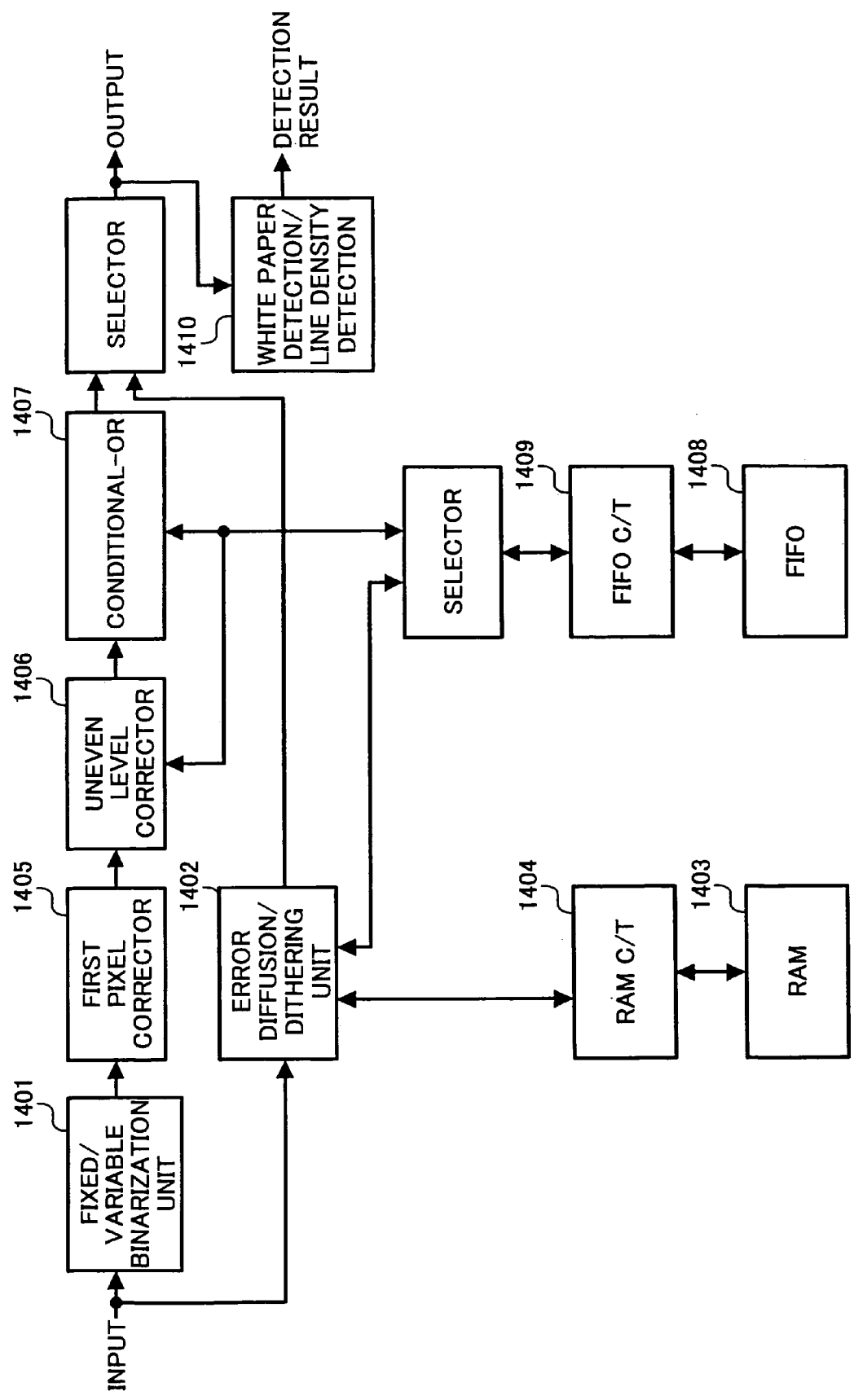
FIG. 14 is a block diagram showing a structure of a grayscale expression converter.

FIG. 14 is a block diagram showing a structure of the grayscale expression converter 1206. The grayscale expression converter 1206 performs blank document page detection on the final processed data. The grayscale expression converter 1206 includes the following units.

(1) Fixed/variable binarization unit 1401: Binarization is performed with respect to a fixed threshold or variable threshold. The variable threshold is generated by a filter unit (not shown). The fixed threshold is set by a CPU (process controller 104).

(2) Error diffusion/dithering unit 1402: N-level error diffusion or n-level dithering is performed. Determination of whether to perform n-level error diffusion or n-level dithering is made depending on whether error data is added to given input data. The threshold matrix used herein is stored in the RAM 1403, and read from the RAM 1403 under the control of the RAM controller 1404. In the error diffusion/dithering unit 1402, the n-level error diffusion or the n-level dither is performed on input data with reference to the threshold values read from a threshold table, and the resultant binary data is output. Each threshold table includes threshold values expressed in 8 bits for 16 pixels×16 pixels. The matrix size can be switched among 16×16, 8×8, 6×6, and 4×4. The values in the threshold table are rewritable by the CPU. When input data is given, correction values to be added are determined by using an error diffusion filter, and error data for input pixels are calculated depending on the binarization result, thereby performing error diffusion.

(3) First pixel corrector 1405: A first pixel in the sub scanning direction is detected, and the first pixel is replaced with a white pixel.

(4) Uneven level corrector 1406: An M×M matrix of input binary data is generated, and pattern matching between a pixel of interest and nearby pixels is performed. If it is determined that the pixel of interest is an uneven pixel, white-black inversion is performed.

(5) Conditional OR operation unit 1407: When a 200×200 dpi image is decimated into a 200×100 dpi image, line breakage is prevented by performing conditional OR operation. When decimation is performed, data to be decimated is input from the external FIFO memory 1408 under the control of the FIFO memory controller 1409. When the conditional OR operation is performed, the reduction ratio in the sub scanning direction is limited to 50%.

(6) White paper detection/line density detector 1410: The line density of document image data is determined, and it is determined whether a given document sheet is blank. That is, the optimum line density for a given document is automatically determined, and a blank document page is automatically detected. In double-density reading, the line density determination is performed for each block with a predetermined number of lines. If it is determined that the optimum line density for all blocks in a page (or a file) to be transmitted is a single density, it is determined that the optimum line density for that page (or the file) is the single density, but otherwise the double density is employed as the optimum line density. The automatic density setting is used when facsimile transmission is performed. More specifically, a document image to be sent by facsimile is read with the double density and stored in the memory. The image data is read from the memory and the line density thereof is converted to an optimum value under the control of the facsimile transmission controller in the facsimile application. The resultant data obtained by the density conversion is transmitted. In this processing, only the determination of the line density is performed. The blank document page detection is performed as follows. When document (or a file) image data is obtained by reading a document with a particular line density, the image data is divided into blocks each including a predetermined number of lines, and each block is examined to determine whether it is blank or not. If it is determined that all blocks of a page (or a file) are blank, it is determined that the page (or the file) is blank. The line density determination and the blank document page detection are performed by means of thresholding, taking into account the halftone condition, the background condition, the thick line condition, the lower-case character condition, and the upper-case character condition. The determination associated with each condition is made based on the number of black runs appearing in each block and the total number of pixels that meet the thresholding condition.

The procedure for detecting black streaks, correcting the black streaks, and displaying a warning is now described.

Figure 15:
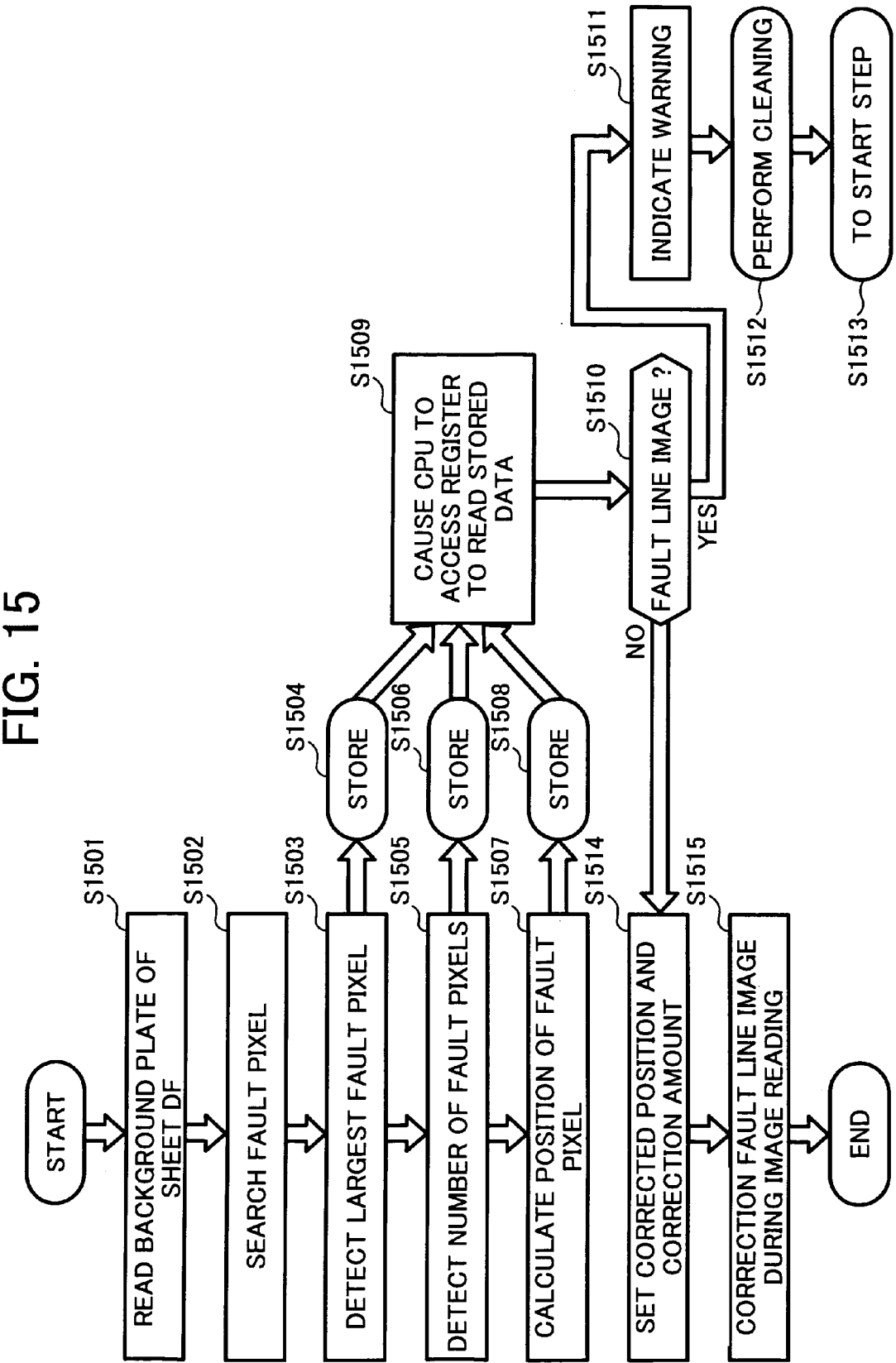
FIG. 15 is a flow chart showing a procedure of detecting black streaks, correcting black streaks, and displaying a warning.

FIG. 15 is a flow chart showing the procedure of detecting black streaks, correcting the black streaks, and displaying a warning.

In a job, before reading of a document is started, the contact glass surface (document reading surface) of the sheet-through document feeder is read, and it is determined whether there is an invalid pixel that can cause a black streak (step S1501). In this step, the background plate of the sheet-through document feeder is read, and the initial state in which there is no document is detected.

Thereafter, the read image data is examined in the main scanning direction to detect invalid pixels (step S1502). The invalid pixel detection in this step is performed by means of thresholding or on the basis of the density gradient. Subsequently, the maximum width of invalid pixel clusters is detected from the result obtained in step S1502 (step S1503). In this step, the maximum width of black streaks which will appear is detected, and it is determined whether the maximum width is negligibly small. The result is stored in an internal register (step S1504). Furthermore, the total number of invalid pixels is calculated (step S1505). In this step, the number of black streaks which will appear is predicted. The result is also stored in an internal register (step S1506). Information indicating locations of streaks and corresponding numbers of invalid pixels are calculated (step S1507). The resultant values are stored in internal registers (step S1508).

Thereafter, the process controller 104 reads information obtained and stored in the previous steps S1504, S1506, and S1508 (step S1509), and determines whether there is a streak image (step S1510).

If it is determined in step S1510 that there is a streak image (that is, if it is determined that the reading surface of the sheet-through document feeder is contaminated with dust or the like) (that is, if the answer to step S1510 is yes), a message indicating that there is dust is displayed on the display screen of the operation control panel 111 (step S1511) to inform a user that cleaning is necessary (step S1512). If paper dust causing the black streak is removed, the job is performed again from the beginning (step S1513).

In a case in which it is undesirable that users are expected to perform cleaning, the information indicating the conditions of the apparatus is read by the process controller 104 and transmitted to a service support center of the apparatus via the system controller 131 and the network. The service support center sends a service person, as required, to perform cleaning. It is desirable to perform maintenance on the apparatus before black streaks appear in images. The timing of checking the conditions of the apparatus is not limited to the beginning of a job, but the checking may be performed by a check routine when the electric power is turned on or when the apparatus is in a waiting state.

On the other hand, in the case in which no invalid pixels are detected or the number of detected invalid pixels is small enough and the size of invalid pixel is small enough to correct the black streak (that is, if the answer to step S1510 is no), the job is continued. In this case, the correction location and the correction amount are determined from the already predicted location and the already predicted size of the black streak (step S1514). When a document image is actually read using the sheet-through document feeder, the streak correction is performed on the document image in accordance with the calculated correction location and the correction amount (step S1515).

In a case in which it is predicted that the black streak cannot be suppressed to a low enough level by the correction process, a warning is displayed or information indicating such a state is transmitted to the service center at a remote location. In response, cleaning or maintenance is performed. The information indicating the presence of invalid pixels that can cause a black streak can also be printed as log data when a service person comes for maintenance. More specifically, the information stored in a nonvolatile memory or the like is read and converted into bitmap data using font data, and printing is performed in accordance with the bitmap data.

Figure 16:
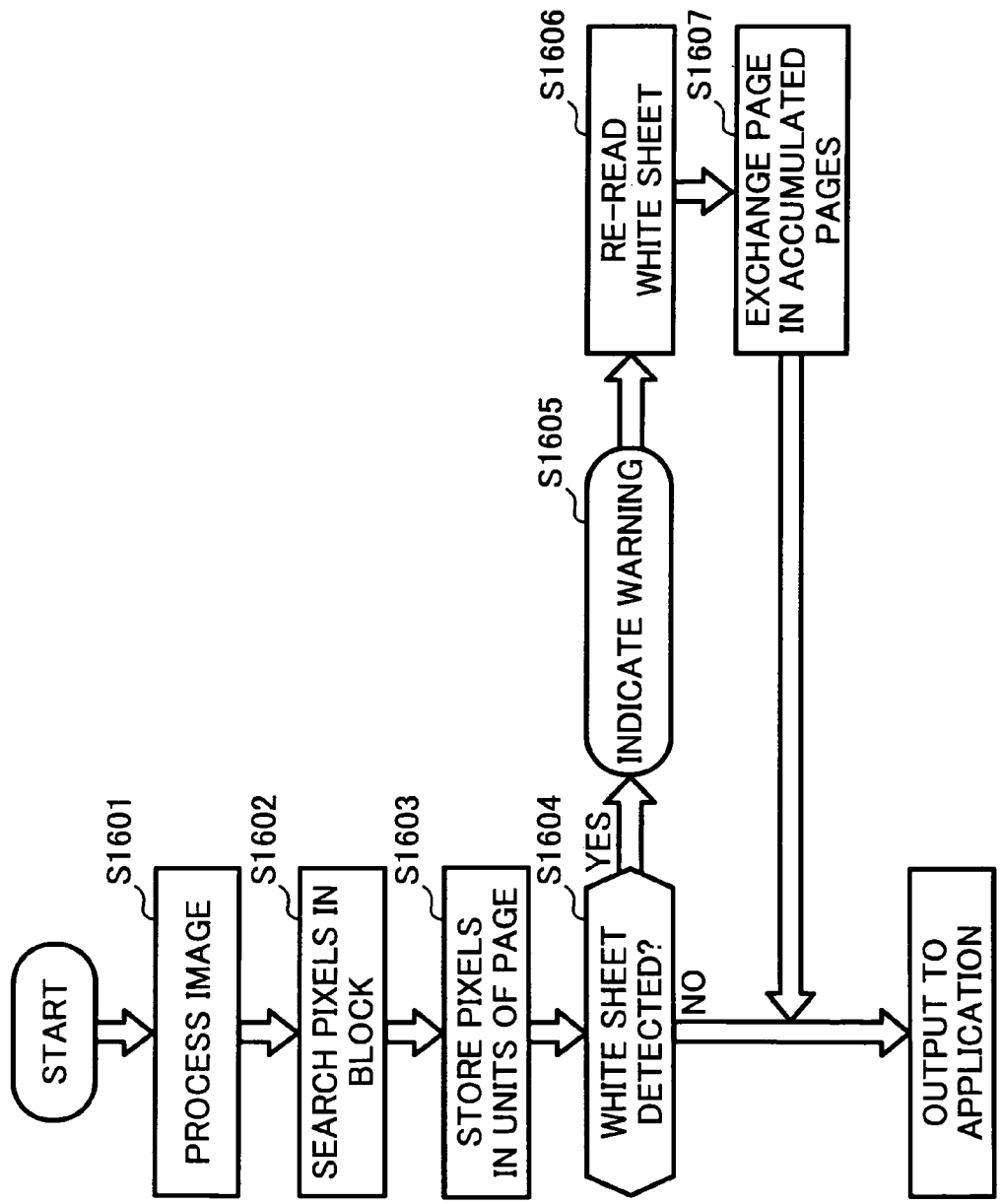
FIG. 16 is a flow chart showing a procedure of detecting a blank document page.

Now, the procedure of detecting a blank document page is described. FIG. 16 is a flow chart showing the procedure of detecting a blank document page. Note that a job may include only a single document sheet or a plurality of document sheets. When a job is started, a document sheet is read and predetermined image processing is performed (step S1601). After completion of all image processing, pixels in each block of binary image data obtained as a result of the image processing are examined over an area slightly smaller than the document size (step S1602). In this step, a plurality of thresholding processes are performed to detect the number of black runs and the background level, and blank-page conditions are determined for valid pixels. In the job, image data is stored in units of pages (step S1603). Thereafter, blank page detection is performed, and pages determined to be blank and the job including blank pages are identified (step S1604).

If the judgment reveals that the job includes a blank document page (that is, if the answer to step S1604 is yes), a warning indicating that there is a blank document page is displayed (step S1605). In the case in which the apparatus is standalone, the warning is displayed on the display screen of the operation control panel 111. In the case in which the apparatus is used as a remote scanner, the warning message is transmitted to a host server via the system controller 131. In the case in which a blank document page is detected, the page is read again to obtain correct image data (step S1606), and the blank image data included in the job is replaced with the correct image data (step S1607). The image data is sorted on the memory module 133 such that pages are arranged in a correct order.

In the case in which no blank document page is detected (that is, if the answer to step S1604 is no), image data has been correctly obtained in the job and stored in the memory module 133 managed by the system controller 131. In this case, the image data stored in the memory module 133 is transferred to the requesting application under the control of the system controller 131. The procedure described above makes it possible to detect a blank document page in an image reproduction apparatus such as a facsimile, a scanner, or a copying machine.

Figure 17:
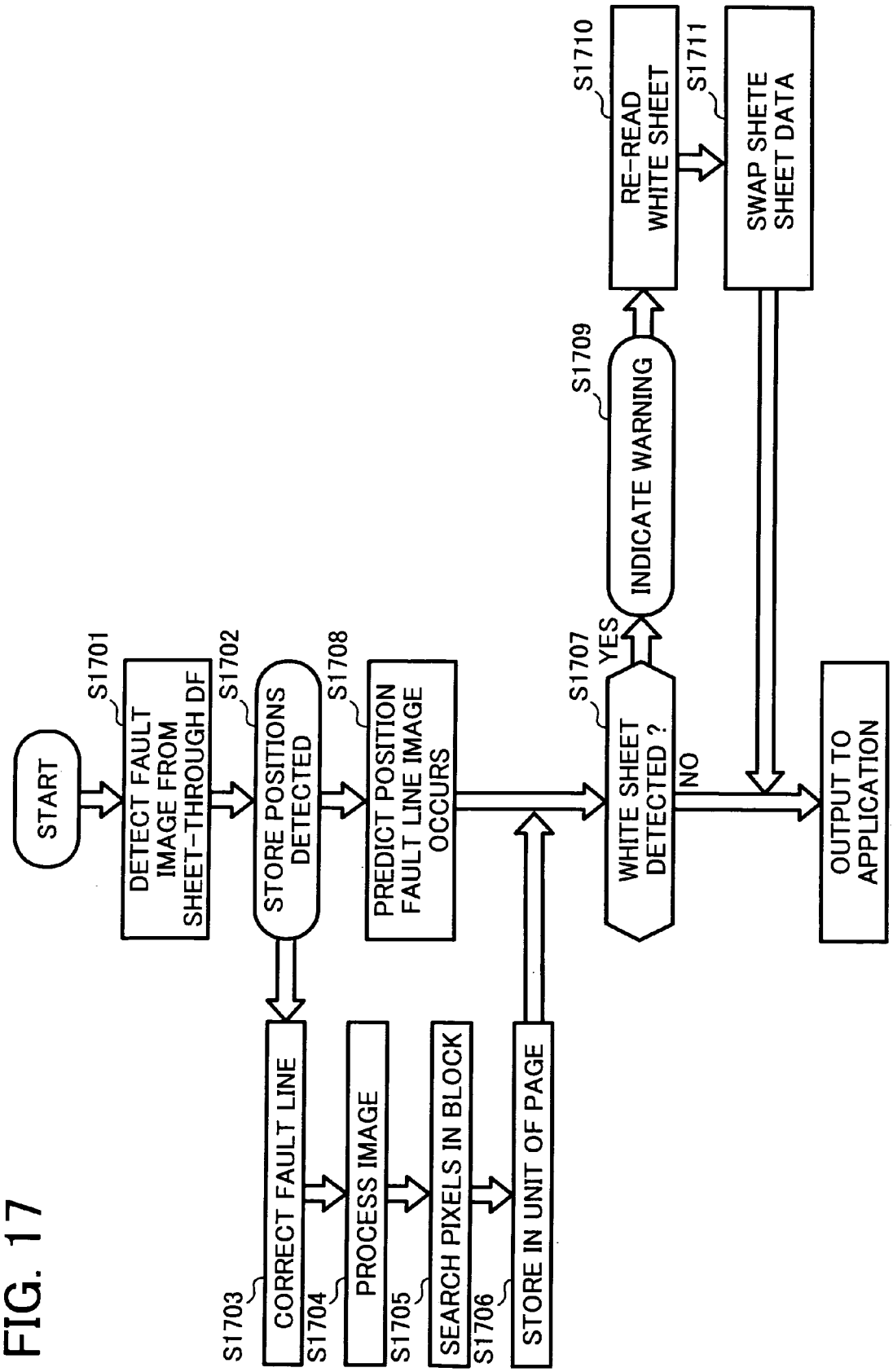
FIG. 17 is a flow chart showing a procedure of detecting a blank document page including a black streak.

Now, when document reading is performed using the sheet-through document feeder, the procedure of detecting a blank document page including a black streak is described. FIG. 17 is a flow chart showing this procedure. Basically, this procedure is a combination of the procedure shown in FIG. 15 and the procedure shown in FIG. 16.

In a job, before reading of a document is started, invalid pixels on the sheet-through document feeder are detected (step S1701). The detection result is stored in an internal register (step S1702). If it is determined in this step that it is obvious that maintenance is required, a warning indicating that cleaning is necessary is displayed or transmitted.

If the black streak is not serious, and it can be corrected by the streak correction process, reading of a document is performed. The read document image is subjected to the black streak correction process in the shading corrector 1203 (step S1703) and then subjected to various image processes (step S1704). Thereafter, pixels in each block are examined by the grayscale expression converter 1206 (step S1705), and image data is stored in units of pages (step S1706). Blank page detection is then performed (step S1707). When a black streak image with a width corresponding to the width of the invalid pixel is detected in a document image stored in step S1702, at a location at which the occurrence of the black streak is predicted (step S1708), the black streak component is removed from the detected blank page image to detect the real state of that page. Thereafter, the determination is performed as to whether the document page is blank (step S1707).

When the blank document page detection process reveals that there is a blank document page, that is, when a blank document page including only a black streak is detected (that is, if the answer to step S1707 is yes), a warning indicating that there is a blank document page is displayed or a warning message is transmitted (step S1709). In this case, re-reading is performed for the page or the job (step S1710), and image data of the blank document page stored is replaced with correct image data (step S1711). Thereafter, the image is output. On the other hand, when no blank document page is detected (that is, if the answer to step S1707 is no), the stored image is output without displaying any warning.

Figure 18:
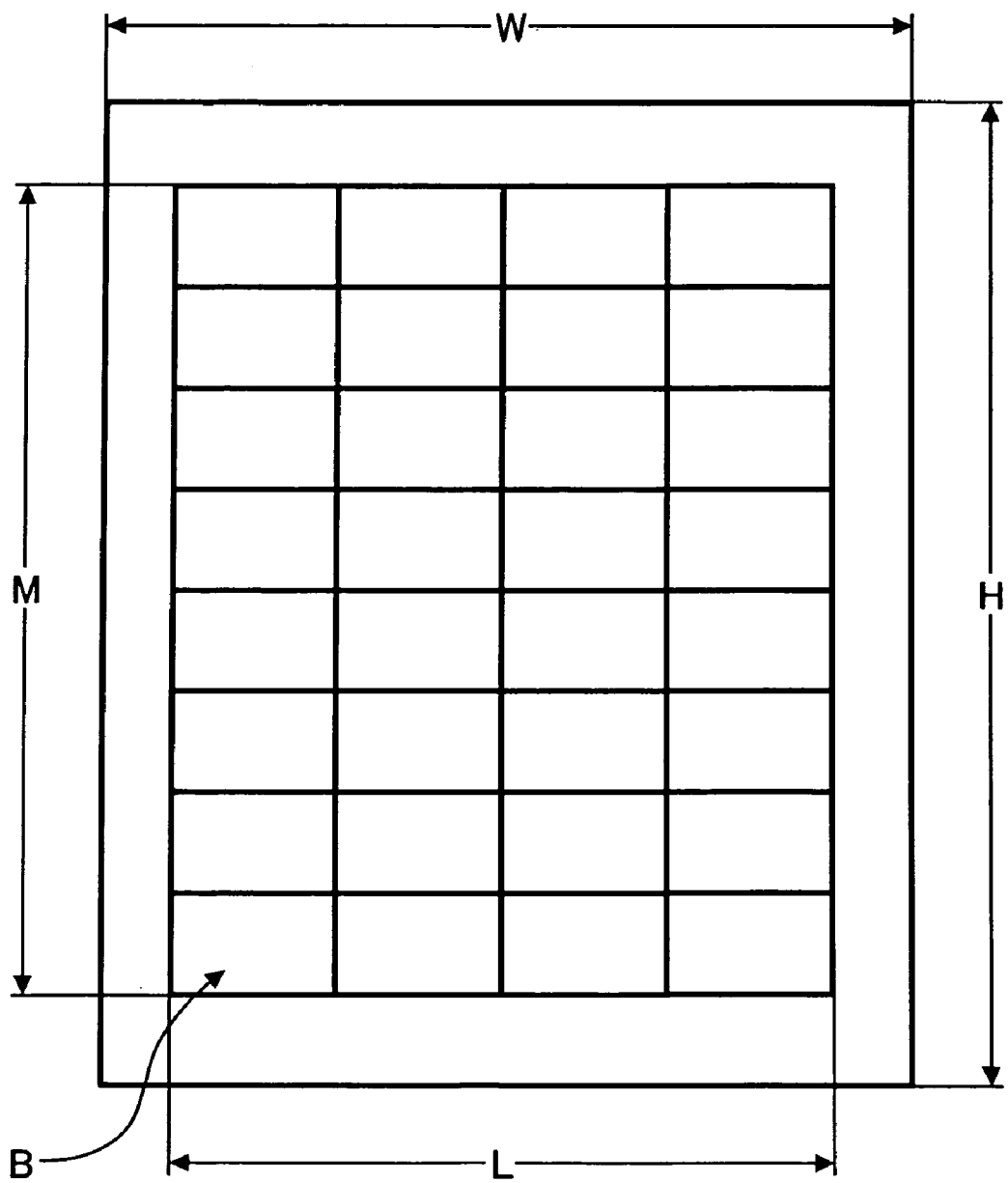
FIG. 18 is a diagram showing a manner in which a document image is divided into blocks in a process of detecting a blank document page.

In the image reproduction apparatus according to the present invention, as shown in FIG. 18, the blank document page detection process is performed for an area (with a width L and a length M) slightly smaller than the document size (with a width W and a height H). More specifically, the area with the width L and the length M is divided into blocks B, and the thresholding process and the black run detection are performed in each block. The blank document page detection is then performed based on the sum taken over all blocks.

Figure 19A:
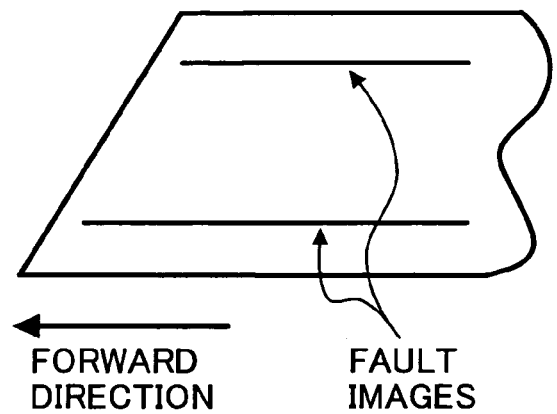
FIGS. 19A and 19B are diagrams illustrating a structure of a sheet-through document feeder.
Figure 19B:
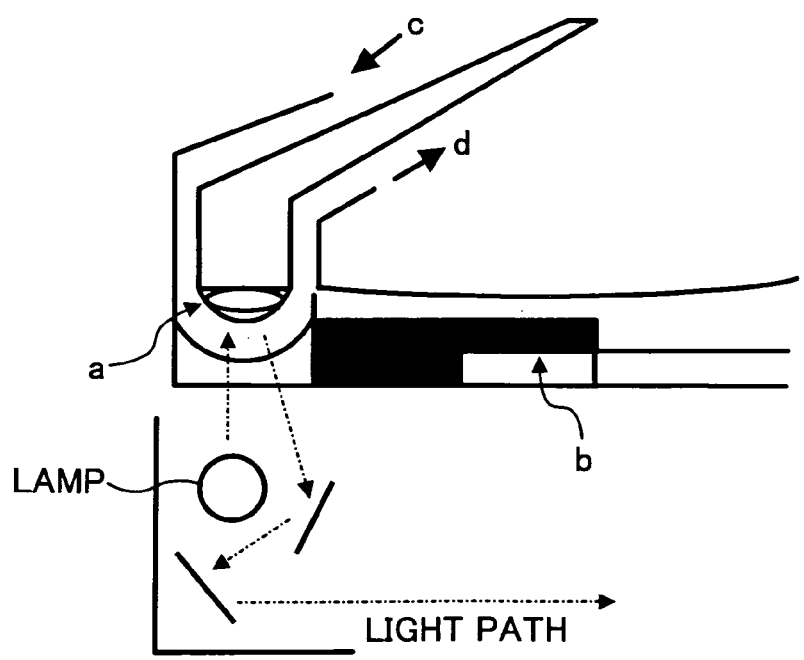
Figure 20:
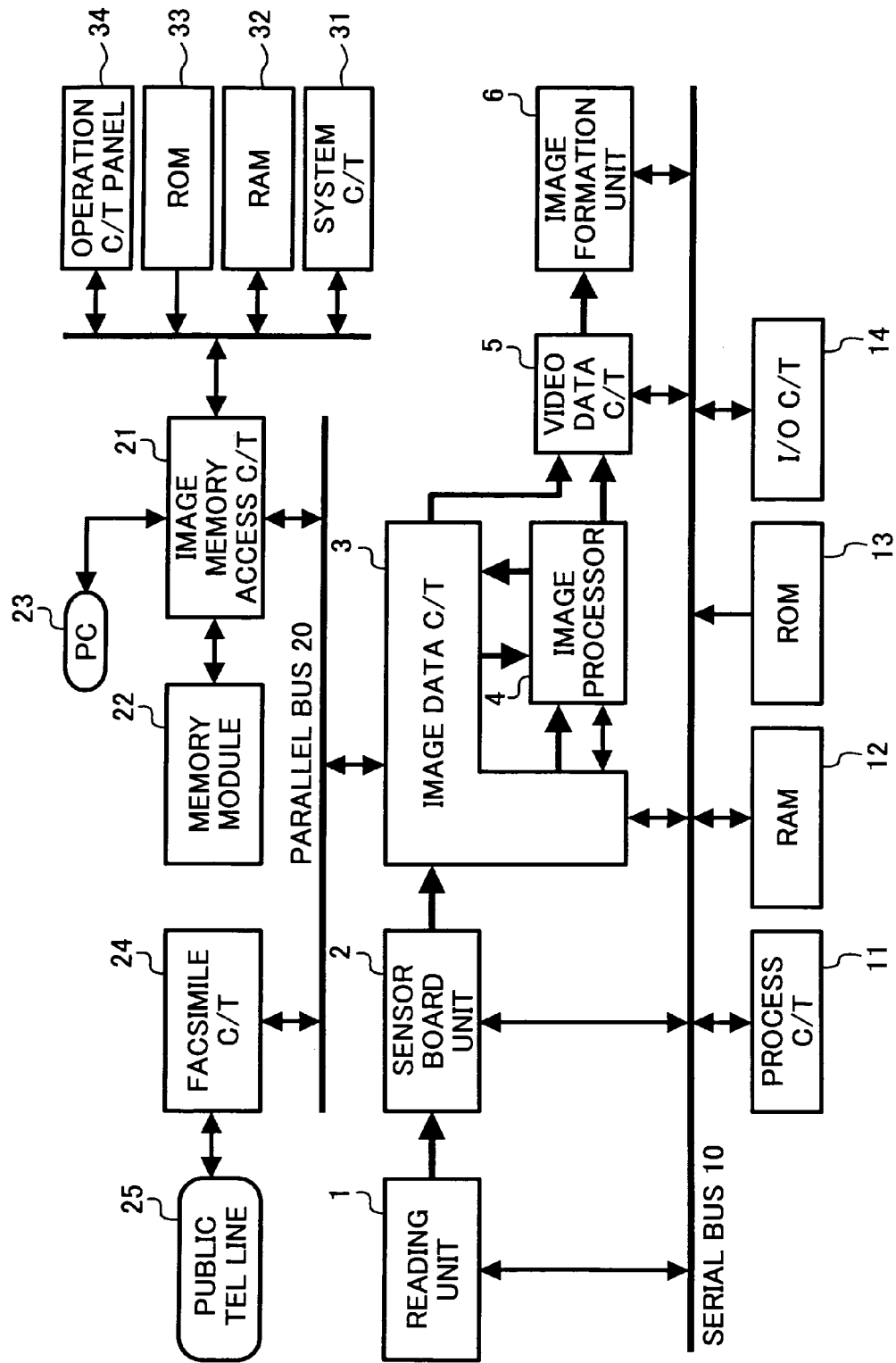
FIG. 20 is a block diagram showing an example of a general structure of a conventional image processing apparatus.

Now, the structure of the sheet-through document feeder is described. FIGS. 19A and 19B are diagrams illustrating the structure of the sheet-through document feeder. FIG. 19A shows black streaks occurring in a document moving direction due to dust present on the contact glass surface. Such a black streak occurs when a subject, which is read as a black dot or a black area, regardless of whether or not there is a document, is present on the surface of the contact glass, and the signal from such a subject is superimposed on a read image data. Although dust on the glass surface is in the form of a small dot, the presence of the dust results in a line in a reproduced image. Thus, such dust results in significant degradation in image quality and results in a loss of image information. In the case in which a document placed on the platen is read, dust in the form of a dot is reproduced as a dot, and thus a user can easily detect the dust. However, in the case in which dust in the form of a dot results in a line streak, a user cannot easily detect the dust.

FIG. 19B shows a manner in which a document is read using the sheet-through document feeder. In the case in which the sheet-through document feeder is used, a carriage including a lamp and a mirror is maintained at a reading position, and only a document is moved during the reading process. The image obtained via the reading is mirror-symmetric with an image that would be obtained in the on-platen reading mode. Therefore, when the image is output, it is necessary to perform a mirror conversion to produce a light-left inverted image, thereby obtaining a correct image. In the reading process, the document is moved by a stepping motor. When the image is enlarged or reduced in the direction of moving the document (in the sub scanning direction), the moving speed is properly changed.

The carriage is placed at a home position (HP) in a waiting state. When a document is read, the carriage is maintained at the home position. However, it is necessary to move the carriage to read the reference white plate to obtain reference data for use in the shading correction. In FIG. 19B, the home position is just below the background plate a. To read the reference white plate b, the carriage is moved to the position just below the reference white plate b. After the luminance distribution across the reference white plate b is read and shading data to be used to normalize read image data is produced, the carriage is returned to the home position just below the background plate a. The carriage is maintained at this position, and a document image is read while moving a document.

A document in the form of a sheet is input from a position denoted by c, passed below the background plate a, and ejected to the position denoted by d. When the document passes below the background plate a, the document surface is read. When the document surface is read, if the contact glass surface is contaminated with dust, a black streak appears in the direction of moving the document in the document image data. To detect invalid pixels at locations where dust is present, the illumination lamp is turned on immediately after the carriage is returned to the home position and before a document is fed, and the contact glass surface is read in the state in which there is no document on the contact glass. Substantially, the sheet-through document feeder's background plate a, which is urged against the glass surface over which the document is passed when the document is read, is read. The background plate is formed of a white plate similar to the reference white plate b, and thus, ideally, a white image is read if there is no dust on the contact surface.

The method of forming an image described above with reference to specific embodiments may be practiced by executing a preinstalled program on a computer such as a personal computer or a workstation. The program may be stored on a computer-readable storage medium such as a hard disk, a flexible disk, a CD-ROM, a MO, or a DVD, and the program may be loaded onto the computer from the storage medium before it is executed. The program may be supplied via a transmission medium such as the Internet or a similar network.

The present invention has been described above with reference to specific embodiments. Note that the present invention is not limited to the details of the embodiments described above, but various modifications and improvements are possible without departing from the spirit and scope of the invention.

The invention claimed is:

1. An image reproduction apparatus including an image copying function for reproducing input image data including image data obtained by reading a document, and for outputting the reproduced image data, the image reproduction apparatus comprising:

extension control means to which a controller board is connectable to add a plurality of optional units to realize plurality of extension functions, the extension control means allowing operation control in the plurality of extension functions to be performed in a same manner as in the image copying function, and allowing image data to be input/output in the extension functions in a same format as in the image copying function, the controller board including a system controller and an arbiter that arbitrates use of resources shared by the plurality of extension functions;

image quality retaining means for retaining a quality of an image reproduced via the extension control means at a level similar to that of an image produced by the image copying function;

operation control means for controlling operation of the image reproduction apparatus in a similar manner, regardless of whether the operation is associated with the image copying function or the plurality of extension functions provided by the extension control means;

resource sharing means for allowing a resource used in the image copying function to also be used by the extension control means in inputting and/or outputting image data;

image input means for reading an image of the document and outputting image data of the document image; and image input/output control means for controlling inputting/outputting of image data depending on an output characteristic of image data output from the image input means such that the image input means inputs/outputs image data in the same form.

2. The image reproduction apparatus according to claim 1, further comprising:

line decimation control means for converting the resolution of the image data; and pixel loss compensation means for compensating for a loss of pixel information caused by line decimation.

3. The image reproduction apparatus according to claim 1, further comprising:

data format conversion means for converting a data format of image data such that transmission and reception of image data to and from the extension control means is performed in a same manner, regardless of whether the image data is color image data or monochrome image data.

4. An image reproduction apparatus according to claim 2, wherein the line decimation control means divides a control signal specifying a reading line into a plurality of control signals and divides a single functional module into a plurality of functions, thereby controlling a density conversion.

5. The image reproduction apparatus according to claim 1, wherein the image input means is one of a contact image sensor and a charge coupled device.

6. An image reproduction apparatus according to claim 5, further comprising:

sequential line discrimination/control means for, when color image data is input using a contact image sensor as the image input means, detecting the color of image data currently being transmitted and processed and for controlling a reading of a plurality of data lines at a time on a color-by-color basis.

7. An image reproduction apparatus according to claim 2, wherein the line decimation control means performs decimation in an optimum manner; and the pixel loss compensation means performs compensation in an optimum manner depending on whether image data is color image data or monochrome image data.

* * * * *